US007613602B2

(12) United States Patent
Kanawa

(10) Patent No.: US 7,613,602 B2
(45) Date of Patent: Nov. 3, 2009

(54) STRUCTURED DOCUMENT PROCESSING APPARATUS, STRUCTURED DOCUMENT SEARCH APPARATUS, STRUCTURED DOCUMENT SYSTEM, METHOD, AND PROGRAM

(75) Inventor: Takuya Kanawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 600 days.

(21) Appl. No.: 11/388,131

(22) Filed: Mar. 24, 2006

(65) Prior Publication Data

US 2007/0027671 A1 Feb. 1, 2007

(30) Foreign Application Priority Data

Jul. 28, 2005 (JP) ............................. 2005-219165

(51) Int. Cl.
*G06F 17/27* (2006.01)
*G06F 17/20* (2006.01)
*G06F 17/30* (2006.01)
*G06F 17/00* (2006.01)

(52) U.S. Cl. ...................... 704/9; 704/1; 707/4; 707/6; 707/102

(58) Field of Classification Search ........................ None
See application file for complete search history.

(56) References Cited

U.S. PATENT DOCUMENTS

| 6,240,407 | B1 * | 5/2001 | Chang et al. ................... 707/2 |
| 6,832,219 | B2 * | 12/2004 | Lal ............................... 707/3 |
| 6,889,223 | B2 | 5/2005 | Hattori et al. |
| 7,054,854 | B1 * | 5/2006 | Hattori et al. .................. 707/3 |
| 7,370,061 | B2 * | 5/2008 | Chakraborty et al. ....... 707/102 |
| 2004/0044659 | A1 * | 3/2004 | Judd et al. ..................... 707/3 |
| 2005/0192983 | A1 * | 9/2005 | Hattori et al. ............... 707/100 |

FOREIGN PATENT DOCUMENTS

| JP | 11-25108 | 1/1999 |
| JP | 2002-82943 | 3/2002 |
| JP | 2002-297605 | 10/2002 |
| JP | 2004-164111 | 6/2004 |
| JP | 2004-234597 | 8/2004 |
| JP | 2005-190163 | 7/2005 |

OTHER PUBLICATIONS

Meuss et al. "Improving index structures for structured document retrieval" 21st BCS IRSG Colloquium on Information Retrieval, 1999.*
Wang, et al. "Enhancive index for structured document retrieval" 12th Int'l Workshop on Research Issues in Data Engineering, 2002.*

(Continued)

*Primary Examiner*—Matthew J Sked
(74) *Attorney, Agent, or Firm*—Finnegan, Henderson, Farabow, Garrett & Dunner, L.L.P.

(57) ABSTRACT

A structured document processing apparatus includes an acquisition unit configured to acquire a structured document, a storage unit configured to store a structure model tree which indicates a typical structure of the acquired structured document, a parsing unit configured to parse the acquired structured document, an updating unit configured to update the structure model tree to match a structure of the parsed structured document therewith, a division unit configured to divide the acquired structured document into a plurality of lexical items, and a calculation unit configured to calculate frequency-of-occurrence information indicating locations of each of the lexical items in the acquired structured document.

20 Claims, 24 Drawing Sheets

OTHER PUBLICATIONS

Polyzotis et al. "Statistical synopses for graph-structured XML databases" ACM SIGMOD, Jun. 4-6, 2002.*

Fiesca et al. "Fast detection of XML structural similarity" IEEE Transactions on Knowledge and Data Engineering, vol. 17, 2005.*

Amer-Yahai et al.; "Galatex: A Conformant Implementation of the Xquery Full-Text Language"; A Research Paper, WWW2005, 10 pages, (May 2005).

Hattori et al.; "Structured Document Search Method, Structured Document Search Apparatus and Structured Document Search System"; U.S. Appl. No. 09/714,627, filed Nov. 17, 2000.

Notification Of Reasons for Rejection mailed Sep. 9, 2008 in Japanese Patent Application No. 2005-219165 (12 pages).

* cited by examiner

```
<Patent ID="3">
  <Title>Structured document search apparatus</Title>
  <Inventor_list>
    <Inventor>
      <Last_name>Tanaka</Last_name>
      <First_name>Ichiro</First_name>
    </Inventor>
    <Inventor>
      <Last_name>Suzuki</Last_name>
      <First_name>Jiro</First_name>
    </Inventor>
  </Inventor_list>
  <Effect>Speeding up search of tagged structured document</Effect>
  <Keyword_list>
    <Keyword>XML</Keyword>
    <Keyword>Structured document</Keyword>
    <Keyword>Database</Keyword>
  </Keyword_list>
</Patent>
```

FIG. 2

| GID | 1 | 2 | 3 | 4 | | N |
|---|---|---|---|---|---|---|
| Gram | Tanaka | XML | Theory | Document | | Charge |
| Frequency of occurrence | 12462 | 63 | 66234 | 836 | | 236 |
| Permuted index list number | 24 | 37 | 67 | 69 | | 1543 |

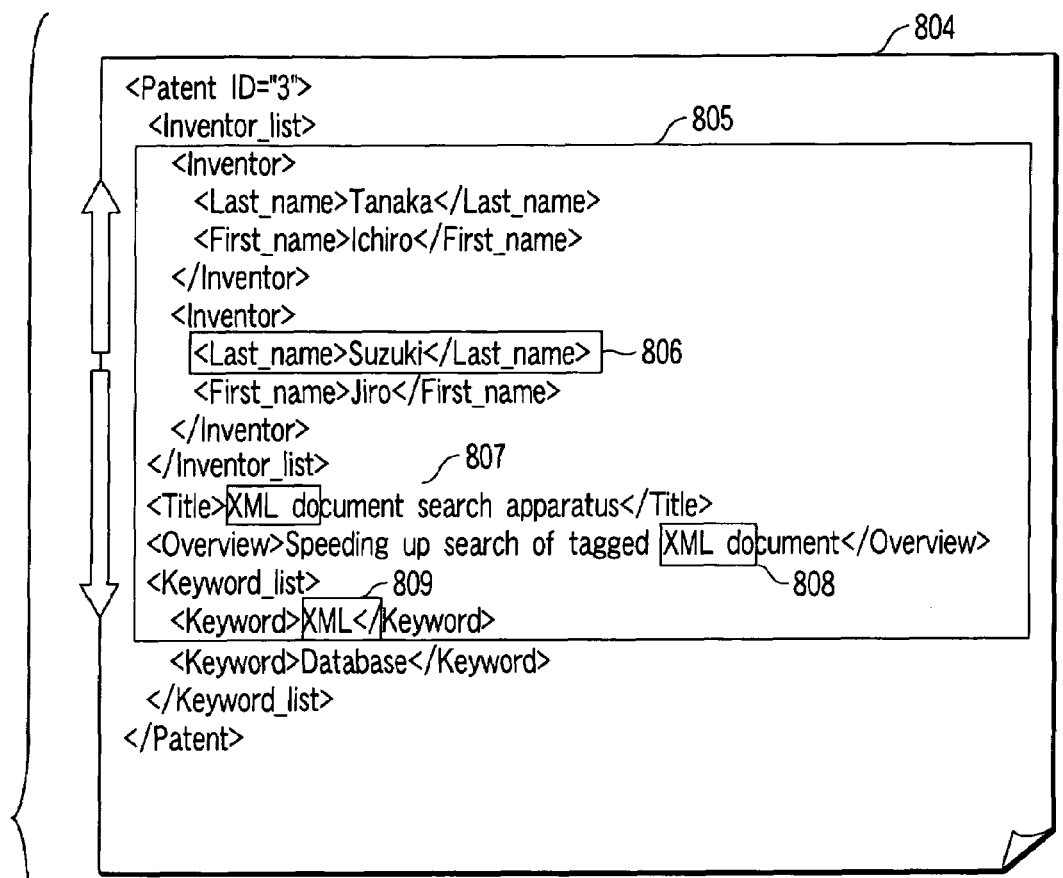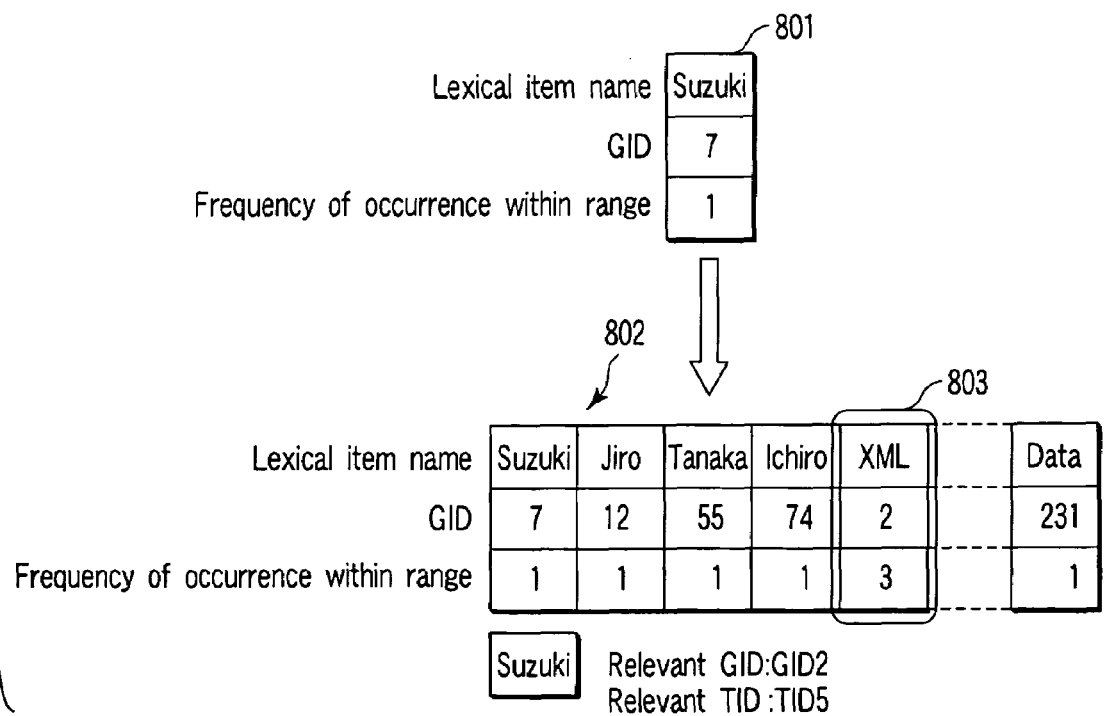
FIG. 8

```
                                                               ┌─903
┌  ┌─────────────────────────────────────────────────────────┐
│  │ <Patent ID="3">                                         │
│  │   <Inventor_list>                                       │
│  │     <Inventor>                                          │
│  │       <Last_name>Tanaka</Last_name>                     │
│  │       <First_name>Ichiro</First_name>                   │
│  │     </Inventor>                                         │
│  │     <Inventor>                                          │
│  │       <Last_name>Suzuki</Last_name>                     │
│  │       <First_name>Jiro</First_name>                     │
│  │     </Inventor>                                         │
│  │   </Inventor_list> ─905                            904  │
│  │   <Title>|XML| document search apparatus</Title>    )   │
│  │   <Overview>|XML| database that speeds up search of tagged |XML| document
│  │   </Overview>  ─907                              ─906   │
│  │   <Keyword_list>    ─908                                │
│  │     <Keyword>|XML|</Keyword>                            │
│  │     <Keyword>Database</Keyword>                         │
│  │   </Keyword_list>                                       │
│  │ </Patent>                                               │
│  └─────────────────────────────────────────────────────────┘
```

╱─901
| Lexical item name | XML | Document | Search | | Data |
|---|---|---|---|---|---|
| GID | 2 | 51 | 87 | | 231 |
| Frequency of occurrence within range | 2 | 2 | 2 | | 1 |

Lexical index information for "XML" ╱─902

| Document ID:1<br>Element ID:18<br>Self TID:9<br>Offset:36<br>GID:51<br>Relevant TID:9 | Document ID:1<br>Element ID:18<br>Self TID:9<br>Offset:40<br>GID:87<br>Relevant TID:9 |
|---|---|

FIG. 9

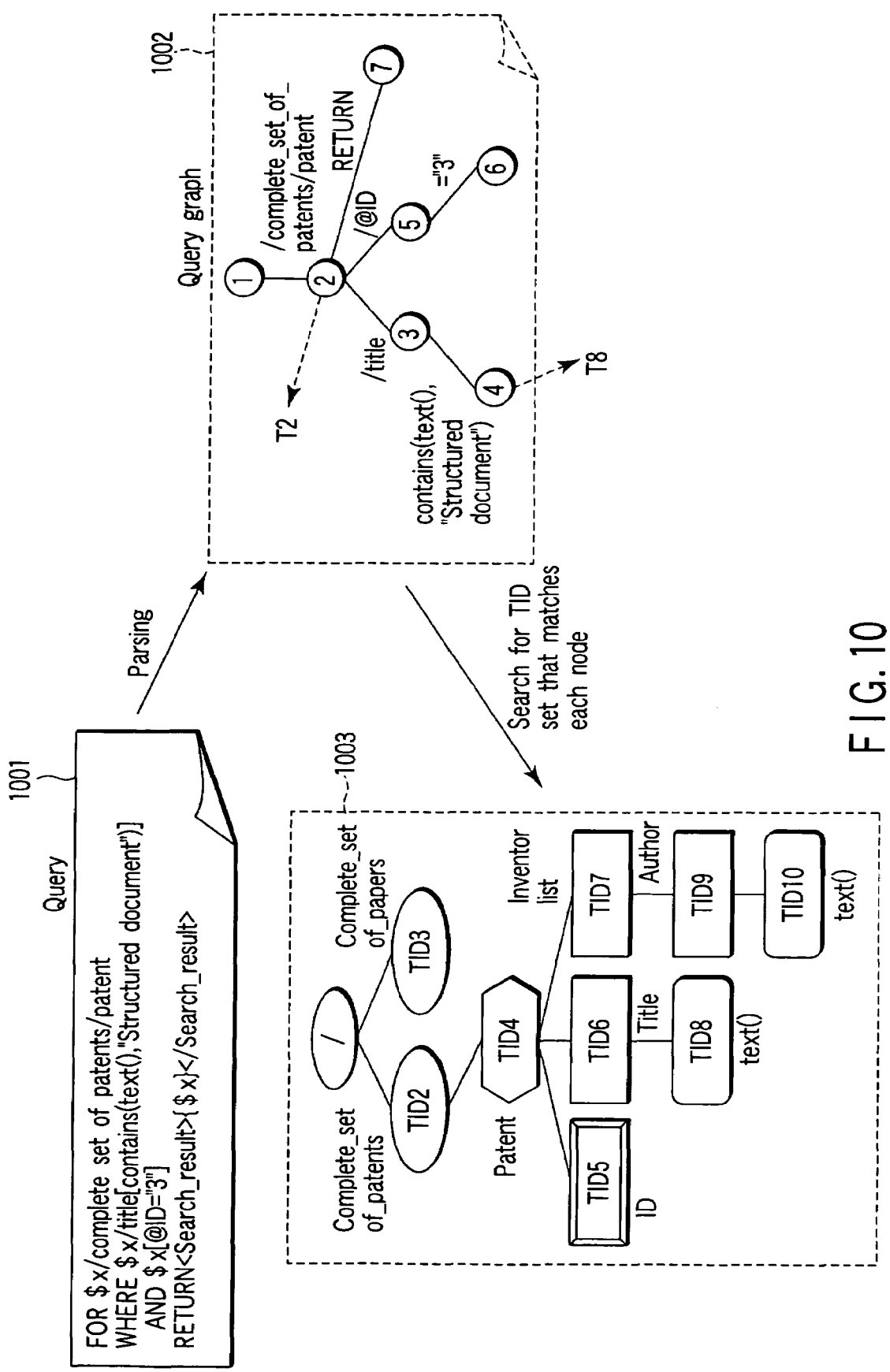
F I G. 10

```
for $x in db("book")//book
for $y in db("paper")//paper
where contains($x//text(),"XML")and contains($y//text(),"Tanaka")
return
<bookList>
<Author><Name>{$x//name/text()}</Name></Author>
{$y/title}
</bookList>
```

FIG. 25

Permuted index list including "Tanaka"

Tanaka → [1|2|3|4|5]

TID7, TID13 are structure limitations

| 2501 First candidate | 2502 Second candidate | 2503 Third candidate | 2504 Fourth candidate | 2505 Fifth candidate |
|---|---|---|---|---|
| Document ID:1<br>Element ID:6<br>Self TID:TID3<br>Position information:0<br>Relevant GID:GID2<br>Relevant TID:TID15 | Document ID:3<br>Element ID:7<br>Self TID:TID7<br>Position information:2<br>Relevant GID:GID2<br>Relevant TID:TID14 | Document ID:9<br>Element ID:33<br>Self TID:TID13<br>Position information:4<br>Relevant GID:GID5<br>Relevant TID:TID12 | Document ID:24<br>Element ID:10<br>Self TID:TID10<br>Position information:5<br>Relevant GID:GID4<br>Relevant TID:TID11 | Document ID:28<br>Element ID:15<br>Self TID:TID9<br>Position information:3<br>Relevant GID:GID33<br>Relevant TID:TID14 |

FIG. 26

Permuted index list including "Ichiro"

Ichiro → [1|2|3|4|5]

TID26, TID37 are structure limitations

| 2601 First candidate | 2602 Second candidate | 2603 Third candidate | 2604 Fourth candidate | 2605 Fifth candidate |
|---|---|---|---|---|
| Document ID:105<br>Element ID:14<br>Self TID:TID26<br>Position information:0<br>Relevant GID:GID15<br>Relevant TID:TID15 | Document ID:200<br>Element ID:15<br>Self TID:TID26<br>Position information:2<br>Relevant GID:GID2<br>Relevant TID:TID29 | Document ID:203<br>Element ID:17<br>Self TID:TID37<br>Position information:4<br>Relevant GID:GID2<br>Relevant TID:TID12 | Document ID:215<br>Element ID:14<br>Self TID:TID26<br>Position information:5<br>Relevant GID:GID4<br>Relevant TID:TID11 | Document ID:300<br>Element ID:14<br>Self TID:TID37<br>Position information:5<br>Relevant GID:GID4<br>Relevant TID:TID11 |

```
                                                            1801 for $x in db("patent")//Patent
for $y in db("paper")//Paper
where contains($x//text(),"Tanaka")and contains($y/Author//text(),"Ichiro")
return
<result>
<Patent><Author_list>{$x//Name}</Author_list></Patent>
<Paper>{$y/Title}</Paper>
</result>
```

```
                                3001
                                  )    Example of search result
<result>
<Patent><Author_list><Name>Tanaka</Name></Author_list></Patent>
<Paper><Title>XML database</Title></Paper>
</result>
<result>
<Patent><Author_list><Name>Tanaka</Name></Author_list></Patent>
<Paper><Title>XML editor</Title></Paper>
</result>
<result>
<Patent><Author_list><Name>Suzuki</Name></Author_list></Patent>
<Paper><Title>Molecular control on photon field</Title></Paper>
 </result>
```

FIG. 30

STRUCTURED DOCUMENT PROCESSING APPARATUS, STRUCTURED DOCUMENT SEARCH APPARATUS, STRUCTURED DOCUMENT SYSTEM, METHOD, AND PROGRAM

CROSS-REFERENCE TO RELATED APPLICATIONS

This application is based upon and claims the benefit of priority from prior Japanese Patent Application No. 2005-219165, filed Jul. 28, 2005, the entire contents of which are incorporated herein by reference.

BACKGROUND OF THE INVENTION

1. Field of the Invention

The present invention relates to a structured document processing apparatus for managing a plurality of structured documents having different document structures using a structured document database having a hierarchized logical structure, a structured document search apparatus for searching the structured document processing apparatus for a desired structured document, a structured document system including the structured document processing apparatus and the structured document search apparatus, a method, and a program.

2. Description of the Related Art

A structured document database for storing or searching for structured document data described in XML (extensible Markup Language) or the like has been proposed. Using the structured document database, search processing which considers a structure and is hardly attained by a conventional text database can be implemented. In order to apply search processing to this structured document database, a query language (represented by XQuery) to structured documents is used. XQuery is a query language which is standardized by W3C (World Wide Web Consortium). A characteristic feature of the query language lies in that the search results are not those obtained by filtering, and new composite data having a structure can be generated based on documents as a plurality of information sources.

On the other hand, in the field of full-text search, a text database that manages character strings as structure-less documents predominates. As important functions of the full-text search, scoring, wild card, neighboring search, ambiguous search, and the like are known. The text database is often required to conduct search using these functions.

Especially, scoring is an indispensable function in the full-text search. By introducing scoring, the user can acquire some pieces of information (e.g., documents) with higher precision as higher search results, i.e., he or she can quickly acquire only required information.

The structured document database also allows full-text search-like use by designating keywords upon query. However, such function is a prefix search function at most, and the functions such as scoring and the like are not sufficiently considered. Since a structured document has a structure, i.e., it is made up of a plurality of elements, it cannot be acquired for respective documents unlike in the full-text search.

A known score calculation scheme is a tf-idf (term frequency-inverted document frequency) scheme. "tf" indicates the frequency of occurrence of a term in a document of interest, and "idf" indicates the number of documents including that term. "tf" gives higher priority to a term with a higher frequency, and "idf" indicates a measure as to whether or not that term is characteristic. By multiplying these values, scoring is made as a tf-idf value.

Since a structured document is made up of a plurality of elements, the level of scoring becomes important. In recent years, since the structured document database is much in demand, it is expected to implement high-speed scoring in the structured document database.

In order to introduce scoring in the structured document database, scoring precision becomes important, and it becomes important to obtain them using a practical time and resources. That is, problems of "precision" and "speed" become important.

For example, Jpn. Pat. Appln. KOKAI No. 2002-297605 proposes a structured document database which implements scoring in consideration of ambiguity of structures and lexis. In this reference, desired data is generated by calculating synonymous expansion of element names, values, and the like by a semantic network, and calculating similarities of structures and lexical items using "depth information" in the hierarchical relationship.

BRIEF SUMMARY OF THE INVENTION

In accordance with a first aspect of the invention, there is provided a structured document processing apparatus comprising: an acquisition unit configured to acquire a structured document; a storage unit configured to store a structure model tree which indicates a typical structure of the acquired structured document; a parsing unit configured to parse the acquired structured document; an updating unit configured to update the structure model tree to match a structure of the parsed structured document therewith; a division unit configured to divide the acquired structured document into a plurality of lexical items; and a calculation unit configured to calculate frequency-of-occurrence information indicating locations of each of the lexical items in the acquired structured document.

In accordance with a second aspect of the invention, there is provided a structured document search apparatus comprising: a connection unit connectable to a structured document processing apparatus that stores a structure model tree indicating a typical structure of a structured document, and frequency-of-occurrence information indicating locations of each of lexical items included in the structured document; a reception unit configured to receive query data which is described in a query language and is required to generate a new composite document formed of partial structures of a plurality of structured documents; a parsing unit configured to parse the query data including elements; a query graph generation unit configured to generate a query graph indicating a relationship among the elements based on the parsed query data; a selection unit configured to select, based on the frequency-of-occurrence information and the query graph, a similar structure similar to the structure model tree from the structured document processing apparatus; a storage unit configured to store similarities indicating similar levels between lexical items; a calculation unit configured to calculate a structure score value indicating a similar degree of the selected similar structure based on the similarities; a cost calculation unit configured to calculate a plurality of processing costs for selecting plans indicating processing orders of elements based on the frequency-of-occurrence information; a selection unit configured to select, from the plans, a plan which has a lowest processing cost of the calculated processing costs; a priority calculation unit configured to calculate processing priority levels of a plurality of processes for making the plan based on the lowest processing cost and the structure score values; a processing execution unit configured to execute the processes in descending order of the processing priority levels; and a result acquisition unit configured to acquire execution results of execution of the plurality of processes as search results.

In accordance with a third aspect of the invention, there is provided a structured document system comprising: a structured document processing apparatus comprising: an acquisition unit configured to acquire a structured document; a storage unit configured to store a structure model tree which indicates a typical structure of the acquired structured document; a parsing unit configured to parse the acquired structured document; an updating unit configured to update the structure model tree to match a structure of the parsed structured document therewith; a division unit configured to divide the acquired structured document into a plurality of lexical items; and a calculation unit configured to calculate frequency-of-occurrence information indicating locations of each of the lexical items in the acquired structured document, and a structured document search apparatus comprising: a reception unit configured to receive query data which is described in a query language and is required to generate a new composite document formed of partial structures of a plurality of structured documents; a parsing unit configured to parse the query data including elements; a query graph generation unit configured to generate a query graph indicating a relationship among the elements based on the parsed query data; a selection unit configured to select, based on the frequency-of-occurrence information and the query graph, a similar structure similar to the structure model tree from the structured document processing apparatus; a storage unit configured to store similarities indicating similar levels between lexical items; a calculation unit configured to calculate a structure score value indicating a similar degree of the selected similar structure based on the similarities; a cost calculation unit configured to calculate a plurality of processing costs for selecting plans indicating processing orders of elements based on the frequency-of-occurrence information; a selection unit configured to select, from the plans, a plan which has a lowest processing cost of the calculated processing costs; a priority calculation unit configured to calculate processing priority levels of a plurality of processes for making the plan based on the lowest processing cost and the structure score values; a processing execution unit configured to execute the processes in descending order of the processing priority levels; and a result acquisition unit configured to acquire execution results of execution of the plurality of processes as search results.

In accordance with a fourth aspect of the invention, there is provided a structured document method comprising: acquiring a structured document; preparing a storage unit which stores a structure model tree which indicates a typical structure of the acquired structured document; parsing the acquired structured document; updating the structure model tree to match a structure of the parsed structured document therewith; dividing the acquired structured document into a plurality of lexical items; calculating frequency-of-occurrence information indicating locations of each of the lexical items in the acquired structured document; receiving query data which is described in a query language and is required to generate a new composite document formed of partial structures of a plurality of structured documents; parsing the query data including elements; generating a query graph indicating a relationship among the elements based on the parsed query data; selecting, based on the frequency-of-occurrence information and the query graph, a similar structure similar to the structure model tree from the storage unit; preparing a storage unit which stores similarities indicating similar levels between lexical items; calculating a structure score value indicating a similar degree of the selected similar structure similar to the requested structure based on the similarities; calculating a plurality of processing costs for selecting plans indicating processing orders of elements based on the frequency-of-occurrence information; selecting, from the plans, a plan which has a lowest processing cost of the calculated processing costs; calculating processing priority levels of a plurality of processes for making the plan based on the lowest processing cost and the structure score values; executing the processes in descending order of the processing priority levels; and acquiring execution results of execution of the plurality of processes as search results.

In accordance with a fifth aspect of the invention, there is provided a structured document program stored in a computer readable medium, comprising: means for instructing a computer to acquire a structured document; means for instructing the computer to access to a storage unit configured to store a structure model tree which indicates a typical structure of the acquired structured document; means for instructing the computer to parse the acquired structured document; means for instructing the computer to update the structure model tree to match a structure of the parsed structured document therewith; means for instructing the computer to divide the acquired structured document into a plurality of lexical items; means for instructing the computer to calculate frequency-of-occurrence information indicating locations of each of the lexical items in the acquired structured document; means for instructing the computer to receive query data which is described in a query language and is required to generate a new composite document formed of partial structures of a plurality of structured documents; means for instructing the computer to parse the query data including elements; means for instructing the computer to generate a query graph indicating a relationship among the elements based on the parsed query data; means for instructing the computer to select, based on the frequency-of-occurrence information and the query graph, a similar structure similar to the structure model tree from the storage unit; means for instructing the computer to access to a storage unit configured to store similarities indicating similar levels between lexical items; means for instructing the computer to calculate a structure score value indicating a similar degree of the selected similar structure based on the similarities; means for instructing the computer to calculate a plurality of processing costs for selecting plans indicating processing orders of elements based on the frequency-of-occurrence information; means for instructing the computer to select, from the plans, a plan which has a lowest processing cost of the calculated processing costs; means for instructing the computer to calculate processing priority levels of a plurality of processes for making the plan based on the lowest processing cost and the structure score values; means for instructing the computer to execute the processes in descending order of the processing priority levels; and means for instructing the computer to acquire execution results of execution of the plurality of processes as search results.

BRIEF DESCRIPTION OF THE SEVERAL VIEWS OF THE DRAWING

FIG. 2 shows an example of structured document data;

FIG. 8 is a view for explaining a process for calculating a relevant GID and relevant TID by a relevant lexical item calculation unit shown in FIG. 3;

FIG. 9 shows an example of lexical index information;

FIG. 10 is a view for explaining a query graph generated by a query language parsing section shown in FIG. 4;

FIG. 25 shows a plurality of candidates included in a permuted index list set associated with $x;

FIG. 26 shows a plurality of candidates included in a permuted index list set associated with $y;

FIG. 30 shows a search result in consideration of scoring.

DETAILED DESCRIPTION OF THE INVENTION

Figure 1:
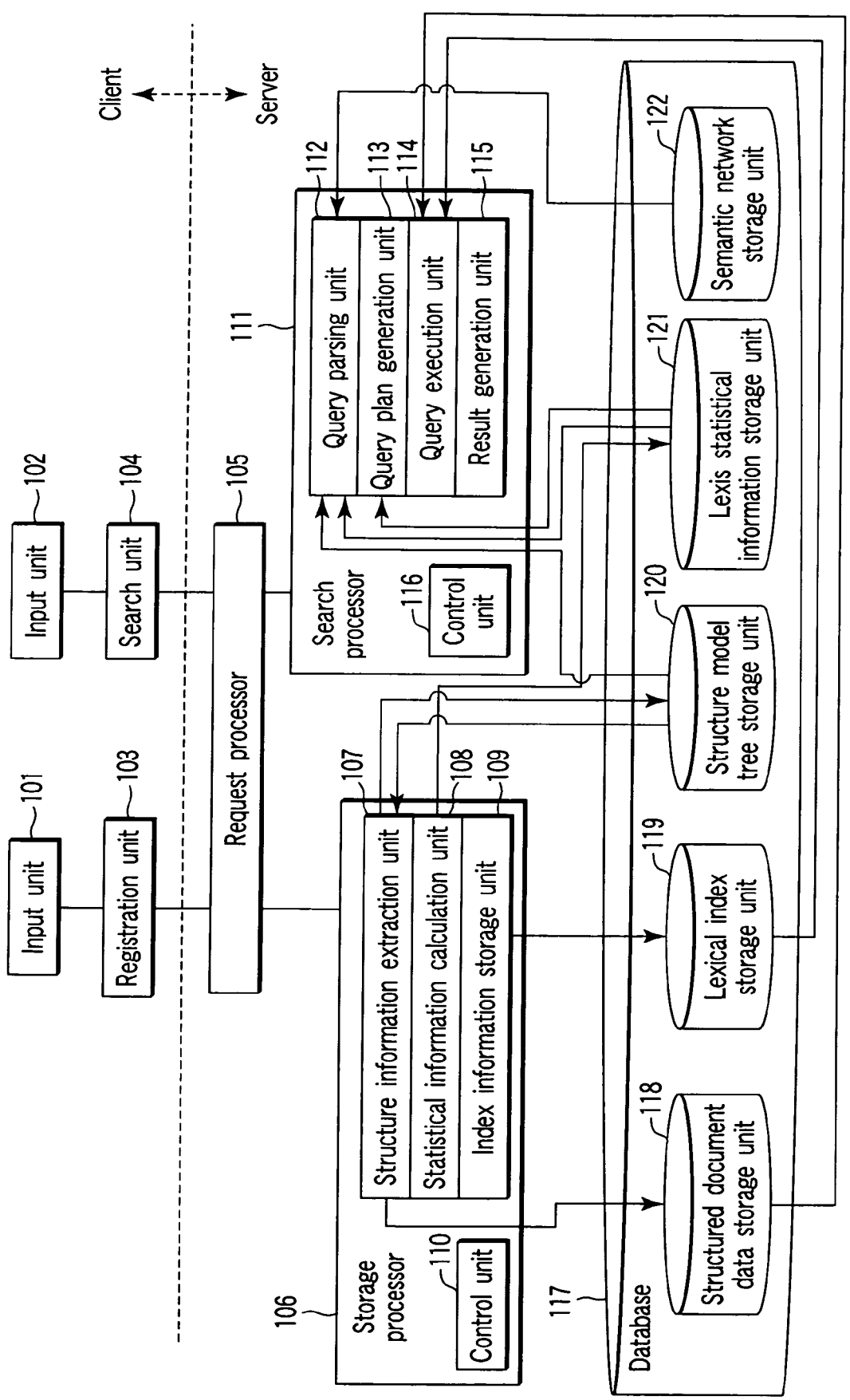
FIG. 1 is a block diagram of a structured document processing apparatus and structured document search apparatus according to an embodiment of the present invention.

A structured document processing apparatus, structured document search apparatus, structured document system, method, and program according to a preferred embodiment of the present invention will be described in detail hereinafter with reference to the accompanying drawings.

The structured document processing apparatus, structured document search apparatus, structured document system, method, and program according to the preferred embodiment of the present invention allow high-speed search with high scoring precision using a processable query language such as XQuery.

An overview of the preferred embodiment will be described first. In this embodiment, especially, scoring that considers "a language that can generate and process new composite data having a structure from a plurality of information sources (e.g., documents)" will be described in detail. Such language is called a processable query language and, for example, XQuery corresponds to such language.

A query language in a structured document database has a high description level to allow to further designate structure information and the like, and can make complex expression unlike keyword-level search such as a full-text search engine. Especially, a language which can generate and process new composite data having a structure from a plurality of information sources (such as XQuery standardized by W3C) has a problem of how to optimize a query together with its high description capabilities, and it is important to consider while merging query optimization and scoring.

In this embodiment, upon executing query processing, a processing priority level is determined for each answer candidate for a query based on a temporary score value and processing cost. A feature of the structured document search apparatus lies in a function of improving the precision and reducing the search time by utilizing this processing priority level.

Other features of this embodiment will be cited below.

(1) The structured document processing apparatus performs feature extraction of structure information (schema), and creates or updates a structure model tree on a database upon registering a structured document. Next, the structured document processing apparatus divides a character string value, and generates a permuted index list as lexical index information of a lexical index. In this case, identifiers on the structure model tree are appended as respective pieces of lexical index information. These are structure limitation conditions upon search conducted by the structured document search apparatus, and are used to improve the search processing speed.

(2) The structured document processing apparatus calculates frequency-of-occurrence information for all lexical items which occur in an element of interest as lexical items with high relevancy with a given lexical item as respective pieces of lexical index information of a lexical index, and leaves the lexical item having a maximum frequency of occurrence. In this case, when the frequency of occurrence of the lexical item having a maximum frequency of occurrence is equal to or lower than a threshold, a calculation range of the frequency-of-occurrence information can also be broadened to have a character string generated by each lexical index information item as a base point. In this manner, scores (those which exceed an element) of other variables arranged in a Return clause by XQuery can be calculated.

(3) Upon searching structured documents, the structured document search apparatus parses a query language (XQuery) and searches similar structures in the form including ambiguity from the structure model tree generated or processed by the structured document processing apparatus from virtual structure information generated based on a structure as an output of the query language. A similarity obtained at that time is defined as a structure score value.

(4) The structured document search apparatus sequentially generates a processing priority level for each candidate of a candidate set whose plan is in execution in consideration of the structure score, lexical score, and individual processing cost, and determines execution or non-execution of processing is to be executed. For example, when structure check processing of a parent-child relationship or the like is required for a candidate value calculated based on the lexical index, if it is estimated that the check processing causes many disk accesses due to deep layers as XML, a high processing cost is set. This cost is compared to the structure score value and lexical score value, and this candidate may be skipped in some cases, thus reducing the computation volume.

(5) A query language processing method is based on a constraint satisfaction scheme (for example, see Jpn. Pat. Appln. KOKAI No. 2002-297605).

The structured document system according to this embodiment, i.e., the structured document processing apparatus and structured document search apparatus will be described below with reference to FIG. 1.

The structured document processing apparatus and structured document search apparatus generally form a server, as shown in FIG. 1, and operate in response to a query from a client, as shown in FIG. 1. The client comprises input units 101 and 102, a registration unit 103, and a search unit 104. These apparatus components may be included in one client, or the first client may include the input unit 101 and registration unit 103, and the second client may include the input unit 102 and search unit 104.

The input unit 101 receives a storage request from the user, and passes it to the registration unit 103. Upon reception of this storage request, the registration unit 103 transmits storage data to be stored to the structured document system as the server. This storage data is a structured document such as an XML document or the like. The structured document includes character strings.

On the other hand, the input unit 102 receives a search request from the user, and passes it to the search unit 104. Upon reception of this search request, the search unit 104 transmits query data, which corresponds to the search request and includes a query language such as XQuery or the like, to the structured document system as the server. Also, the search unit 104 receives a search result calculated by the structured document search apparatus in the structured document system. This search result has a data format of, e.g., XML data.

The structured document system comprises the structured document processing apparatus and structured document search apparatus. The structured document processing apparatus comprises a request processor 105 and a storage processor 106, and also comprises, as a database 117, a structured document data storage unit 118, a lexical index storage unit 119, a structure model tree storage unit 120, a lexis statistical information storage unit 121, and a semantic network storage unit 122.

The structured document search apparatus comprises the request processor 105 and a search processor 111, and comprises, as the database, the structured document data storage unit 118, the lexical index storage unit 119, the structure model tree storage unit 120, the lexis statistical information storage unit 121, and the semantic network storage unit 122.

The request processor 105 receives data transmitted from the client, and determines whether the received data is storage data based on the storage request or query data including the query language based on the search request. Based on this determination result, when the request processor 105 receives the storage data, it outputs the storage data to the storage processor 106. On the other hand, when the request processor 105 receives the query data, it outputs the query data to the search processor 111. Furthermore, the request processor 105 transfers the processing result obtained by the search processing of the search processor 111 to the client.

Upon reception of the storage data from the client, the storage processor 106 parses a structured document included in this storage data, generates lexical index information associated with search, and controls the respective storage units of the database to store corresponding lexical index information.

Upon reception of the query data from the client, the search processor 111 generates desired structured data by referring to the respective storage units included in the database based on the designated query data, and transfers the obtained structured data to the client.

The storage processor 106 comprises a structure information extraction unit 107, a statistical information calculation unit 108, an index information storage unit 109, and a control unit 110.

The structure information extraction unit 107 parses a structured document included in the storage data from the client, and collates the parsed structured document with a structure model tree stored in the structure model tree storage unit 120. The unit 107 then updates the structure model tree to match the parsed structured document, and stores the updated structure model tree in the structure model tree storage unit 120. Also, when no structure model tree is stored in the structure model tree storage unit 120, the structure information extraction unit 107 generates a structure model tree which matches the structured document, and stores the generated structured model tree in the structured model tree storage unit 120. The structure information extraction unit 107 updates information associated with structure information (parent-child and brother relationships among elements in the document) of the structured document included in the storage data, and stores the updated information in the structured document data storage unit 118. The structure information extraction unit 107 expands the structure model tree into an object tree format such as a DOM (Document Object Model), assigns structure model tree identifiers (to be referred to as TIDs hereinafter) to respective nodes of the structure model tree, and stores the TIDs in the structured document storage unit 118 together with the structure information. An example of the TID will be described later using FIG. 5.

The statistical information calculation unit 108 is executed to obtain information associated with indexing and scoring for search. The statistical information calculation unit 108 divides a lexical item of a portion corresponding to a character string, and assigns lexical identifiers (to be referred to as GIDs hereinafter) to the divided lexical items. The unit 108 generates indices for respective lexical items, and calculates the degree of relevance of each lexical item with another lexical item. The statistical information calculation unit 108 assigns, to each lexical item, a document ID and element ID in which that lexical item occurs, a position of occurrence, a TID corresponding to that element, a GID with a high degree of relevance (relevant GID), and a TID of a structure in which that GID occurs most frequently (relevant TID), in addition to the GID. The statistical information calculation unit 108 generates these lexical identifiers and calculation results as lexical index information. The relevant GID and relevant TID will be described later with reference to FIG. 3. The statistical information calculation unit 108 calculates frequency-of-occurrence information for all lexical items which occur in elements of the structured document, stores the frequency-of-occurrence information in correspondence with the GIDs, and stores the lexis table in the lexis statistical information storage unit 121. The statistical information calculation unit 108 generates a permuted index list by associating the lexis table and lexical index information.

Figures 6, 7:
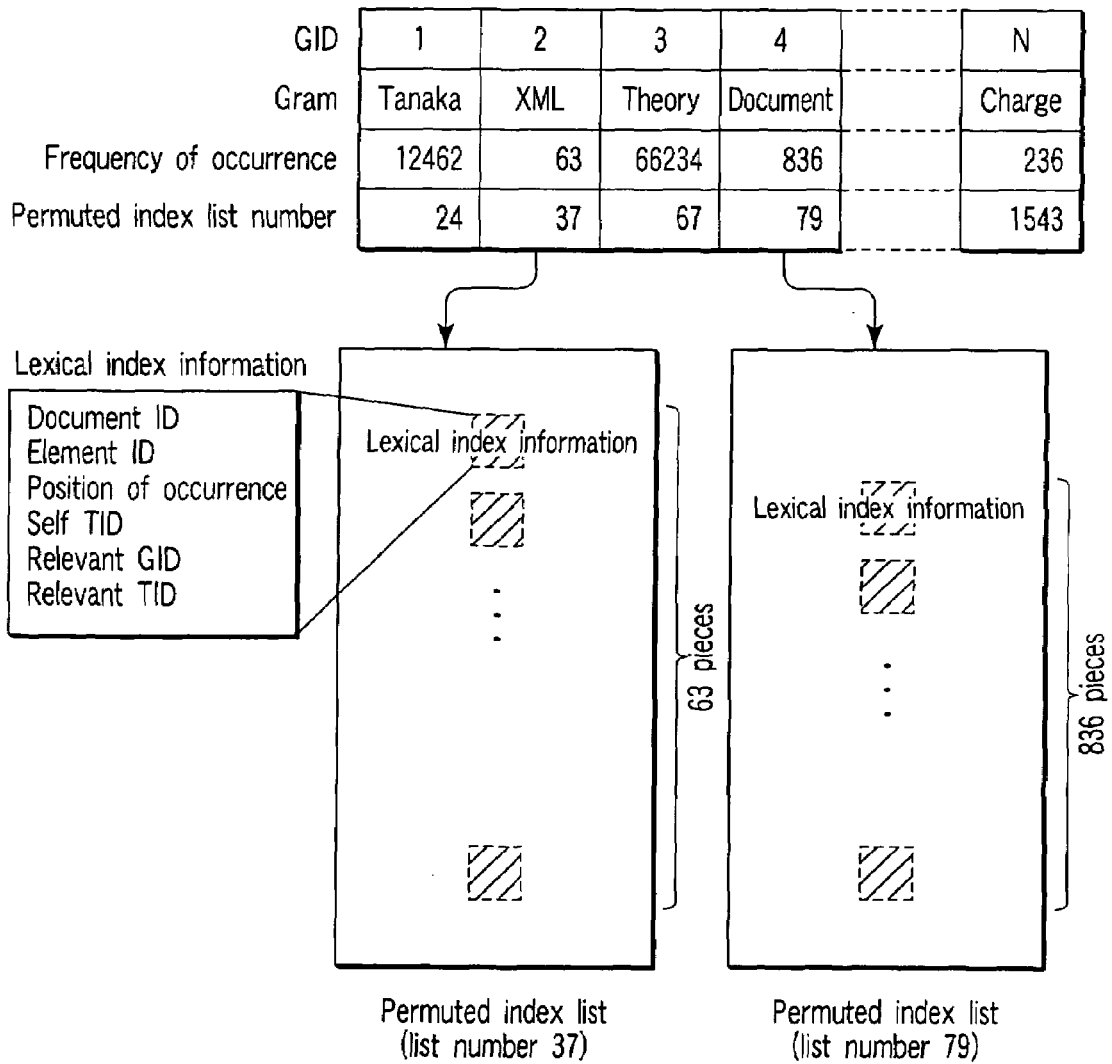
FIG. 6 shows a lexis table.
FIG. 7 shows the relationship among the lexis table, permuted index list, and lexical index information.

The index information storage unit 109 stores the permuted index list generated by associating the lexis table and lexical index information in the lexical index storage unit 119. Data are stored as shown in FIG. 7. Respective pieces of lexical index information stored on each permuted index list are calculated, as described above, and are stored in the lexical index storage unit 119. An example of the lexis table will be described later with reference to FIG. 6. The relationship between the lexis table and lexical index information will be described later with reference to FIG. 7.

The control unit 110 controls the operations of the overall storage unit 106.

The structured document data storage unit 118 stores the information associated with the structure information of the structured document included in the storage data, which is extracted by the structure information extraction unit 107. The structured document data storage unit 118 appends corresponding TID information to respective nodes of an object tree, and stores these data. The structured document data storage unit 118 hierarchically stores documents in a tree structure pattern like a directory structure of UNIX (registered mark).

The lexical index storage unit 119 stores the permuted index list generated by associating the lexis table and lexical index information.

The structure model tree storage unit 120 pre-stores a structure model tree. Also, the unit 120 stores a structure model tree updated by the structure information extraction unit 107.

The lexis statistical information storage unit 121 stores frequency-of-occurrence information as lexis statistical information.

The semantic network storage unit 122 stores a semantic network which associates a word and related words to have similarities. The semantic network expresses a similar relationship among lexical items in the form of a graph. That is, lexical items having a similar relationship are connected via an arc, and a similarity value between these lexical items is given to the arc, thus forming a network among the lexical items.

The search processor 111 comprises a query parsing unit 112, a query plan generation unit 113, a query execution unit 114, a result generation unit 115, and a control unit 116.

The query parsing unit 112 receives, as an input, a query as the search request from the user, which is received by the request processor 105, parses the input query, and generates a query graph. The query parsing unit 112 calculates as a structure limitation condition as a structural limitation condition on the database for the query graph. Furthermore, the query parsing unit 112 receives virtual structure information as a result to be requested to be finally obtained as the query, and searches the structure model tree storage unit 120 for a structure similar to this structure. The unit 112 selects a similar structure, and calculates a similarity of this similar structure with reference to the semantic network storage unit 122. Furthermore, a similar structure search section 403 reflects the similarity corresponding to this structure on scoring.

The query plan generation unit 113 receives a query condition graph as an input, and generates a combination of various data stored in the structured document database in consideration of a search condition generated in the query. The query plan generation unit 113 estimates a processing cost upon execution of the query by utilizing the information of the query parsing unit 112, and generates a plan to be executed in practice. The query plan generation unit 113 investigates how to execute processing with a lower processing cost by adding the limitation conditions of a structure limitation condition generation section 402 and the similar structure search section 403 to the query graph generated by a query language parsing section 401.

The query execution unit 114 generates a set as candidates by sequentially executing plan information generated by a query plan generation unit 113. The query execution unit 114 estimates a processing cost upon processing each candidate. The query execution unit 114 calculates a processing priority level required to postpone the processing of a candidate which is expected that a final score value is low and has a heavy processing cost. The query execution unit 114 executes processing in turn from candidates with higher processing priority levels based on the determined execution or non-execution of processing. The query execution unit 114 repetitively executes processing in accordance with the generated plan, and checks the number of results after execution of the last processing.

The result generation unit 115 generates XML data of a structured document as a search result. In this case, the result generation unit 115 sorts a set of retrieved structured documents in descending order of similarity, and outputs it in the XML format. The result generation unit 115 generates XML data as many as the number of acquired documents as search results in turn from upper ones.

The control unit 116 controls the operations of the overall search processor 111.

An example of a structured document described in XML will be described below with reference to FIG. 2. XML is a representative language used to describe a structured document. FIG. 2 shows an example of "patent" information as an example of the structured document described in XML.

XML and SGML use tags (also called elements) to express a document structure. The tags include a start tag and an end tag. By bounding an element of structured document information by the start tag and end tag, character string separation in a document and an element to which that character string belongs can be specifically described. The character string is also called text.

The start tag closes an element name by symbols "<" and ">", and the end tag closes an element name by symbols "</" and ">". The contents of an element that follows the tag are repetition of a character string or child element. Attribute information like "<element name attribute-"attribute value">" can be set in the start tag. Although not described in FIG. 2, an element which does not include any character string like "<patent DB> </patent DB>" can be expressed like "</patent DB>" as a simple description method.

The document shown in FIG. 2 has an element starting from a "patent" tag as a document root, and includes, as child elements, element sets starting from a "title" tag, "inventor list" tag, "inventor" tag, "effect" tag, "keyword list" tag, and "keyword" tag. For example, an element starting from the "title" tag includes one character string like "structured document search apparatus". In general, a "document" is formed of a plurality of tags, and a "document" handled by a text database or the like is often handled as a linkage of only character string values while ignoring these tags.

Figure 3:
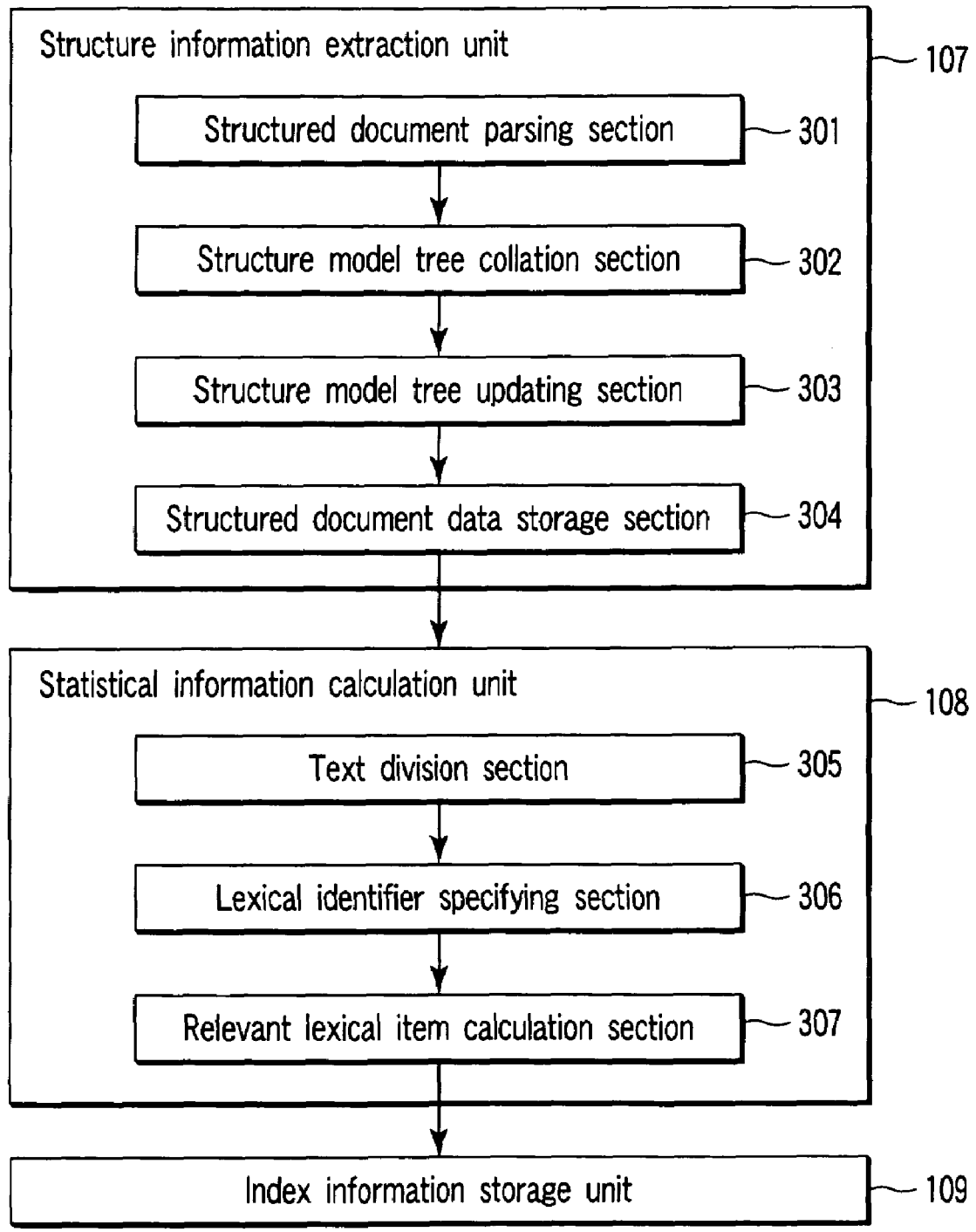
FIG. 3 is a block diagram of a storage processor shown in FIG. 1.

The structure information extraction unit 107 and statistical information calculation unit 108 included in the storage processor 106 will be described below with reference to FIG. 3.

The structure information extraction unit 107 comprises a structured document parsing section 301, a structure model tree collation section 302, a structure model tree updating section 303, and a structured document data storage section 304.

The statistical information calculation unit 108 comprises a text division section 305, a lexical identifier specifying section 306, and a relevant lexical item calculation section 307.

The structured document parsing section 301 receives a structured document in a text format passed from the request processor 105, and parses this structured document to expand it to an object tree format like a DOM. The structured document parsing section 301 assigns a document ID to the document, and appends unique element IDs to elements which form the object tree. In addition, the section 301 appends a position of occurrence, and a TID corresponding to each element. The position of occurrence indicates the position in a character string by the number of characters.

The structure model tree collation section 302 scans the object tree to extract characteristic structure information. When the structure model tree has already been registered in the structure model tree storage unit (116) on the database, the section 302 collates that structure model tree with the object tree. An example of the object tree and structure model tree will be described later with reference to FIG. 5.

The structure model tree updating section 303 consolidates structures in which a given tag redundantly appears on the same plane into one structure, and extracts it as a characteristic structure, and generates and updates such structure information as a structure model tree.

The structured document data storage section 304 gives TIDs corresponding to the structure model tree to nodes expanded to the DOM format previously, and stores the TIDs in the structured document data storage unit 118 together with the structured document.

The text division section 305 divides a character string into lexical items of a portion corresponding to the character string on the object tree, so as to generate information required to generate indices for lexical items. More specifically, the section 305 receives a character string as an input, and divides the character string to be divided into a plurality of lexical items by, e.g., morphological analysis, an N-gram scheme, or the like. After that, the relevant lexical item calculation section 307, generates lexical index information for each divided lexical item.

The statistical information calculation unit 108 associates unique GIDs to the divided lexical items in place of managing the divided lexical items as character strings. The items of GIDs are included in the lexis table. An example of the lexis table will be described later with reference to FIG. 6. The relationship between the lexis table and lexical index information will be described later with reference to FIG. 7.

The lexical identifier specifying section 306 specifies an identifier corresponding to each divided lexical item, and assigns it to that lexical item. This identifier includes a document ID and element identifier (to be referred to as an element ID hereinafter) in which that lexical item occurs, a position of occurrence, a TID corresponding to that element, a relevant GID, and a relevant TID. The structured document parsing section 301 automatically assigns the document ID and element ID. The position of occurrence indicates the character string position by the number of characters. The structured document parsing section 301 also calculates the position of occurrence and the TID corresponding to the element. The relevant GID and relevant TID are calculated by the relevant lexical item calculation section 307 to be described below.

Basically, the relevant lexical item calculation section 307 sets a GID of a lexical item with a highest frequency of occurrence in a given character string as a relevant GID in association with divided lexical items. However, when the number of characters included in a character string is small, the section 307 broadens the search range to set a GID of a lexical item with a high frequency of occurrence within this search range as a relevant GID. A minimum frequency of occurrence is set as a threshold of the frequency of occurrence, and when the frequency of occurrence of a lexical item with a maximum frequency of occurrence is smaller than the threshold upon calculating a relevant lexical item in the selected character string, the relevant lexical item is not determined based only on that character string, and the same processing is done by broadening the range in the order of an attribute value, a character string of a brother element, and a character string of a parent element to have that character string as a base point until the frequency of occurrence exceeds the threshold. Note that the threshold value of the minimum frequency of occurrence may be appropriately determined in accordance with a target element size in place of a fixed value. A practical example upon determining a relevant GID will be described later with reference to FIG. 8.

The relevant lexical item calculation section 307 calculates under the assumption that a TID for a lexical item with a highest frequency of occurrence in a character string which is being searched for a relevant GID is a relevant TID. In this case, when a given lexical item occurs a plurality of number of times in an identical element, as a relevant GID of the second or subsequent lexical item, a GID with a second highest frequency of occurrence is appended as a relevant lexical item in place of that with a maximum frequency of occurrence. In this way, as for lexical items with higher frequency of occurrence in a character string, a plurality of relevant GIDs can be appended. The relevant lexical item calculation section 307 generates lexical index information for the divided lexical items in this way. An example of the lexical index information will be explained later with reference to FIG. 9.

Figure 4:
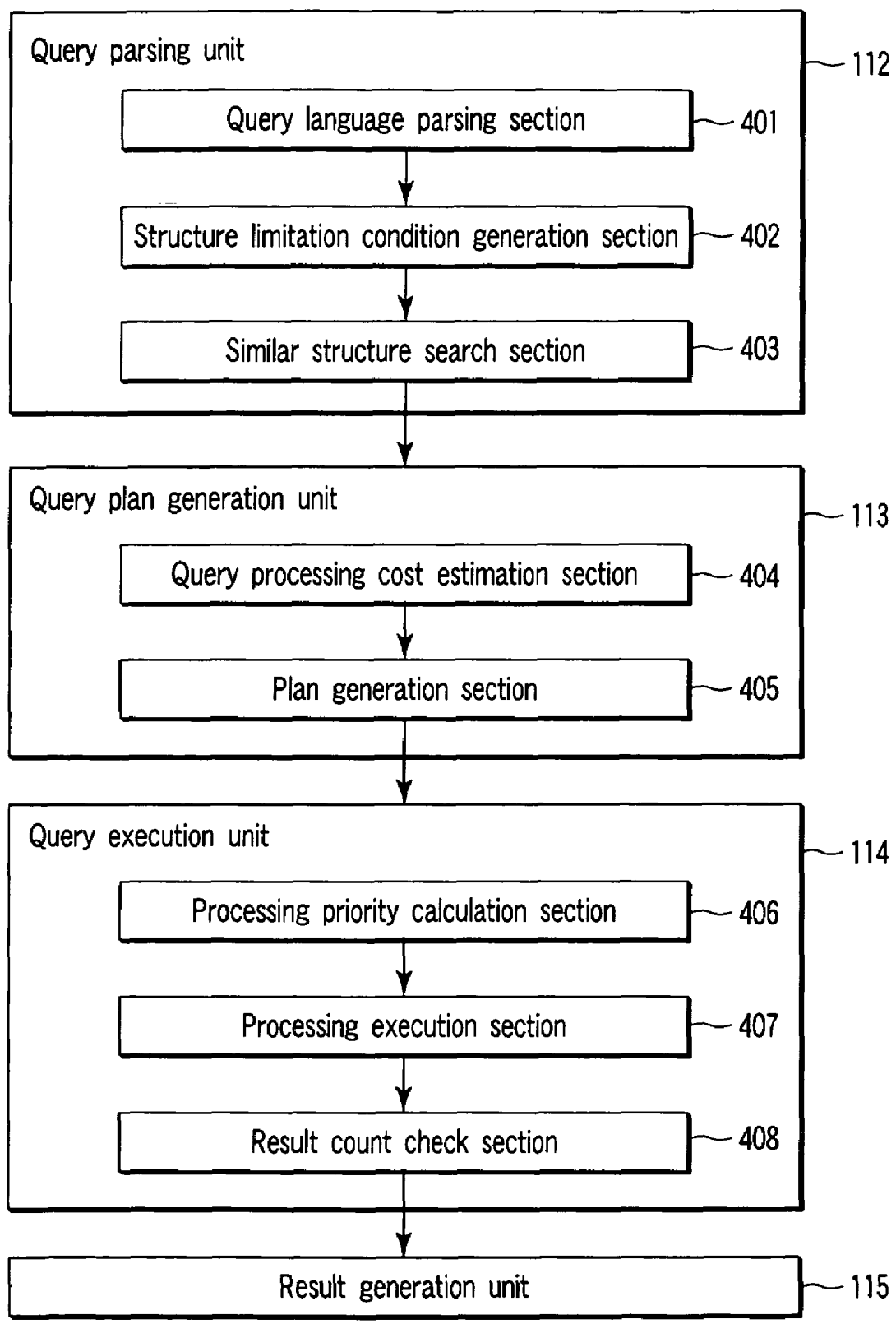
FIG. 4 is a block diagram of a search processor shown in FIG. 1.

The query parsing unit 112, query plan generation unit 113, and query execution unit 114 included in the search processor 111 will be described below with reference to FIG. 4.

The query parsing unit 112 comprises a query language parsing section 401, a structure limitation condition generation section 402, and a similar structure search section 403.

The query plan generation unit 113 comprises a query processing cost estimation section 404, a plan generation section 405 and a result count check section 408.

The query execution unit 114 comprises a processing priority calculation section 406 and a processing execution section 407.

The query language parsing section 401 syntactically parses query data (e.g., a query) passed from the request processor 105, and generates a query graph as a parsing result, i.e., it converts query data into a format which can be processed by the structured document search apparatus. This query graph indicates a limiting relationship among elements included in the query data, which is required when the plan generation section 405 generates a query plan. Syntactic parsing is also called parsing, and a query graph is obtained as a parsing result. The query graph generated by the query language parsing section 401 will be described later with reference to FIG. 10.

The structure limitation condition generation section 402 calculates a structure limitation condition as a structural limitation condition on the database for the query graph generated by the query language parsing section 401. The structure limitation condition is given to an arc of the query graph, and is a TID pair [parent TID limitation, child TID limitation] on the structure model tree corresponding to a parent node and child node. By calculating the parent-child relationship of the structure limitations, the number of candidates can be narrowed down early by the structure limitations. A practical example of the operation of the structure limitation condition generation section 402 will be described later with reference to FIG. 10.

The similar structure search section 403 receives virtual structure information formed by composite documents described in a Return clause as a result to be finally requested to be obtained as a query of XQuery, and searches the structure model tree storage unit 120 for a structure similar to that structure with reference to the frequency-of-occurrence information storage in the lexis statistical information storage unit 121. The section 403 then selects a similar structure, and calculates a similarity of this similar structure with reference to the semantic network storage unit 122. Furthermore, the similar structure search section 403 reflects the similarity corresponding to this structure on scoring.

Meanwhile, in the processable query language represented by XQuery, the Return clause can describe a virtual element, attribute, character string, and the like, which do not actually exist on the database. The user can freely describe these virtual element, attribute, character string, and the like in a query. Since no virtual structure relationships such as $x, $y, and the like in the Return clause exist on the database, they are not reflected on scoring intact.

However, since a data structure to be finally generated based on these composite documents is one indication of intention with respect to information the user wants, it should be reflected on scoring. For example, when the result is summarized by <titleList>, the user expects that its contents are those related to <titleList>. When structures similar to these contents are set with higher score values, information with high precision can be quickly presented. This score value is defined as a structure score value.

However, when the user describes a query, tag names often fluctuate or structurally missing or excessive descriptions often exist. This is because the user normally does not know information about the storage structure of tag names in the database and so forth. Therefore, in order to absorb such fluctuations of the tag names and structure, the similar structure search section 403 expands the tag names and the like with reference to the semantic network storage unit 122, and allows search with a similarity even for non-strict structures. An example of the contents of the semantic network storage unit 122 will be described later with reference to FIG. 12.

When the similar structure search section 403 calculates a structure score value, it searches the structure model tree stored in the structure model tree storage unit 120 for a structure in the actual database similar to the virtual data structure as the output of the Return clause. In this case, search is conducted while absorbing slight tag name fluctuations using the contents of the semantic network storage unit 122.

When the similar structure search section 403 finds similar structure information from the structure model tree, it appends a similarity expanded so far on the semantic network for each TID, and sets that appended value as a structure score value. An example of calculation of the structure score value by the similar structure search section 403 will be described later with reference to FIG. 13.

Note that the present invention is characterized in that the similar structure search section 403 parses the configuration of the output structure of the Return clause in advance, and searches the structure model tree in consideration of ambiguity. Hence, the building method and precision of the semantic network, and the matching algorithm on the structure model tree may adopt existing techniques.

A principal role of the query plan generation unit 113 is to investigate how to execute processing with a lower processing cost by adding the limitation conditions of the structure limitation condition generation section 402 and similar structure search section 403 to the query graph generated by the query language parsing section 401.

The query processing cost estimation section 404 makes a processing cost calculation required to determine the execution order of processing in association with the query graph generated by the query language parsing section 401. The query processing cost estimation section 404 often makes upstream expansion after a candidate set is narrowed down in advance based on an index such as a lexical index or the like. In this case, however, the section 404 determines a processing cost after it estimates the frequencies of occurrence of lexical items from the frequency-of-occurrence information stored in the lexis statistical information storage unit 121. The query processing cost estimation section 404 speeds up processing by utilizing various kinds of statistical information such as the CPU processing cost, disk access frequency, low frequency of combining processing, memory size limitation, presence/absence of an index, and the like, in addition to the frequency-of-occurrence information.

The plan generation section 405 determines the processing order of the query graph based on the processing cost estimated by the query processing cost estimation section 404. In general, there are a plurality of candidates of these plans. One of these plans that can lower the processing cost is selected and executed. The plan generation section 405 merely determines the processing order of the query graph in advance based on the processing cost or the like, and the query execution unit 114 actually executes the query processing based on the plan.

The query execution unit 114 sequentially executes plan information generated by the plan generation section 405, and generates a set as candidates. Actual processes that form a plan are defined as operators. The operators include, e.g., a lexical index search operator, structure collation operator, and the like. Each operator corresponds to a process for applying filtering to have an arc as the limitation condition upon moving from a given node to another node in the query graph and generating a candidate set. It is desirable to avoid an increase in candidate set and execution of heavy processing as much as possible during search. An example of the plan and operators included in the plan will be described later with reference to FIG. 14.

The query execution unit 114 sequentially executes operators by repeating the processing priority calculation section 406 and processing execution section 407. Upon completion of the processing of the plan generated by the plan generation section 405, the result count check section 408 checks the number of results.

The processing priority calculation section 406 estimates a processing cost upon processing each candidate in advance. The processing priority calculation section 406 calculates a processing priority level required to postpone the processing of a candidate which is expected that a final score value is low and has a heavy processing cost.

In general, a candidate with a high processing cost can be detected in advance. A typical example is processing in the structure collation operator. In this case, the processing priority calculation section 406 accesses the structured document data storage unit 118 and investigates structure information (parent-child and brother relationships and the like) stored in the unit 118. The aforementioned upstream expansion means these structure collation operators. The structure collation operators also include downstream expansion to be described later. It is expected that a processing cost when each structure collation operator performs structure collation for deep layers or a huge document is high.

It is important for the query plan generation unit 113 how to avoid such operators including heavy processing. However, since the plan utilizes the estimated processing cost, it cannot be a plan which anticipates the processing costs of all candidates. For this reason, processing with a high processing cost must often be inevitably executed.

Since this embodiment considers a scoring scheme for a structured document, the user wants only results with higher score values, and often does not use those with lower score values consequently. By utilizing this fact, a method of postponing processing of a candidate with a high processing cost may be used.

However, high processing cost bears no relation to whether or not that candidate is desired data of the user. As for information that the user wants to be scored in a higher rank even when it has a high processing cost, it must be processed first. Hence, it becomes important to efficiently process a candidate set which is not desired by the user and has a high processing cost.

The processing priority calculation section 406 calculates a processing priority level for each candidate upon processing the candidate. The processing priority level is specified by multiplying a processing cost value which corresponds in inverse proportion to the magnitude of a processing cost which is expected to be required to execute the processing in practice, the structure score value, and the lexical score value. This processing priority calculation method is not limited to multiplications, and a function uniquely determined by three parameters "processing cost value", "structure score value", and "lexical score value" may be used. Details of the operation of the processing priority calculation section 406 will be described later with reference to FIG. 15.

The processing priority calculation section 406 sequentially calculates a processing priority level based on the structure score value, lexical score value, and processing cost from the lexical index information, and determines execution or non-execution based on that value in the middle of processing (a plan which is not a final result).

The processing execution section 407 executes processing in turn from the one which has a higher processing priority level based on execution or non-execution of processing determined by the processing priority calculation section 406.

The result count check section 408 repetitively executes the processing priority calculation section 406 and processing execution section 407 in accordance with the plan generated by the plan generation section 405, and checks the number of results after execution of the last operator. When the number of results of the query processing is equal to or smaller than the number of results to be acquired that the user wants, the processing is re-executed from an operator which is not processed yet, thus repeating processing until a desired number of results to be acquired is consequently obtained. The practical operations of the processing execution section 407 and result count check section 408 will be described later with reference to FIG. 17.

An example of the object tree and structure model tree will be described below with reference to FIG. 5.

Figure 5:
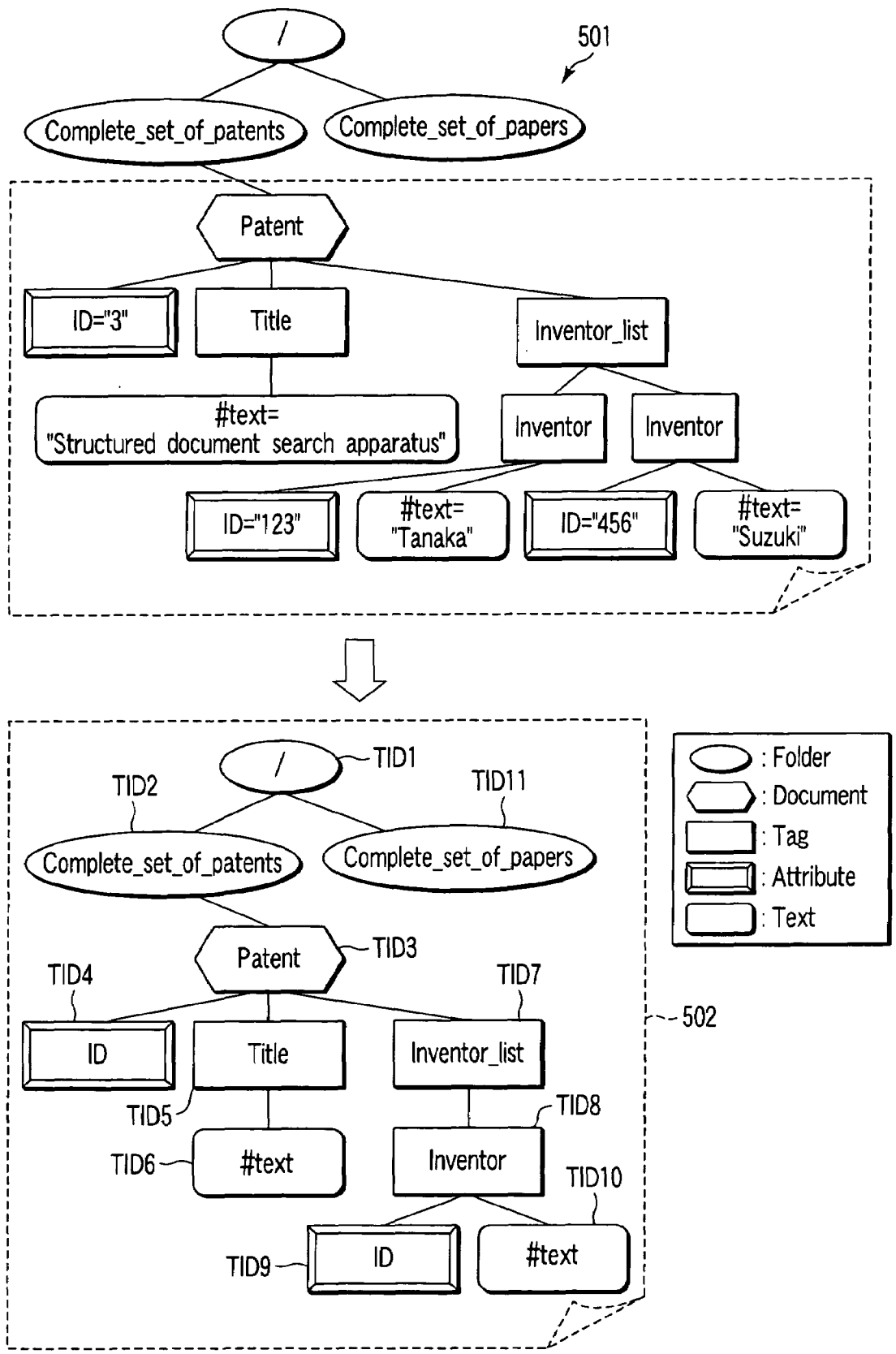
FIG. 5 shows examples of an object tree and structure model tree.

An upper tree shown in FIG. 5 is an example of an object tree 501, and a lower tree shown in FIG. 5 is an example of a structure model tree 502. The structure model tree collation section 302 scans the object tree 501 to extract structure information. In the example of FIG. 5, the object tree 501 redundantly includes inventor tags on the same plane. The structure model tree updating section 303 consolidates such redundant structures to one, and extracts it as a characteristic structure. As shown in the structure model tree 502, the section 303 generates such structure information as a structure model tree, and sequentially updates information. Note that TID1, TID2, . . . , TID10 shown in the structure model tree 502 are examples of the structure model tree identifiers.

An example of the lexis table will be described below with reference to FIG. 6.

The lexis table records, as lexical index information, information such as GIDs, character strings (Gram) divided by the text division section 305, total frequency-of-occurrence information in the database, storage addresses (permuted index list numbers) of corresponding permuted index lists, and the like.

The relationship between the lexis table and lexical index information will be described below with reference to FIG. 7.

Permuted index lists exist in correspondence with the GIDs included in the lexis table. The permuted index list includes a plurality of pieces of lexical index information as many as the value of frequency of occurrence described in the total frequency-of-occurrence information for each GID. In the example of FIG. 7, GID=2 corresponds to a permuted index list with list number=37, and this permuted index list includes 63 pieces of lexical index information in correspondence with frequency of occurrence=63.

An example when the relevant lexical item calculation unit 307 determines a relevant GID will be described below with reference to FIG. 8.

A case will be exemplified wherein the minimum frequency of occurrence is tentatively set to be 3 when the relevant lexical item calculation unit 307 performs indexing for a character string node <last name> Suzuki</last name>. Within a range 806 of <last name> Suzuki</last name>, since the frequency of occurrence of "Suzuki" within the range is 1, it does not reach the minimum frequency of occurrence=3. Therefore, the relevant lexical item calculation section 307 broadens the frequency of occurrence calculation range. Initially, the section 307 re-calculates frequency-of-occurrence information for a "virtual character string" obtained by merging a character string of <first name> as a brother element of "Suzuki". The section 307 repeats this broadening processing in the order of an attribute, child, brother, and parent. In the example of FIG. 8, when the relevant lexical item calculation unit 307 broadens the frequency of occurrence calculation range to a range 805, if the frequency of occurrence of "XML" included in <keyword> is counted, since "XML" appears at three positions 807, 808, and 809, its frequency of occurrence reaches "3" as a minimum threshold. When the range is broadened, a table 801 is updated like a table 802. As a result, in case of this example, a lexical item "Suzuki" is stored in the lexical index information to have "XML" of GID2 as a relevant lexical item. That is, the relevant GID of "Suzuki" is GID2. Also, since the relevant TID of "Suzuki" is the TID for "XML", TID5 is set based on the structure model tree 502 in FIG. 5.

An example of the lexical index information will be described below with reference to FIG. 9. FIG. 9 explains an example of lexical index information for a lexical item "XML" obtained by dividing a character string in an <overview> tag when the minimum frequency of occurrence is set to be "2".

In this case, "XML" occurs twice in the <overview> tag. When the relevant lexical item calculation section 307 searches for a relevant lexical item for this "XML", since no character string reaches the minimum frequency of occurrence in a range 904, the range is broadened. When the range is broadened to <title>, the relevant lexical item calculation section 307 can find two character strings "document" and "search" which reach the minimum frequency of occurrence. Then, it is determined that "XML" has two relevant lexical items "document" and "search", and their GIDs are "51" and "87" from a table 901, respectively. There are two pieces of lexical index information in correspondence with "document" and "search", as shown in a table 902 of FIG. 9, and each information includes information of a document ID, element ID, self TID, offset, GID, and relevant TID.

A query graph generated by the query language parsing section 401 will be described below with reference to FIG. 10.

When a query 1001 is input from the search unit 104, the query language parsing section 401 parses the query 1001 to obtain a query graph 1002. Nodes in the query graph 1002 in FIG. 10 correspond to candidate sets, and arcs correspond to limitation conditions. For example, as shown in FIG. 10, ② and ③ have a structure limitation condition/title as a limitation condition, and ③ and ④ have a limitation condition associated with a lexical item and structure, i.e., contains (text( ), "structured document").

How the structured document search apparatus efficiently searches for these nodes is determined depending on an optimization scheme of a query used to generate such query graph 1002. For example, in contains (text( ), "structured document"), since a character string set including "structured document" is indexed in advance upon storage, the processing can be speeded up by utilizing this index first, i.e., generating a plan to trace from ④ to ③. When a plan to trace from ③ to ④ is generated, an XML document undergoes search while collating structures in turn from the root, and the structured document search apparatus may determine that the processing cost is heavy. Note that narrowing down candidates while tracing from downstream to upstream is defined as upstream expansion, and narrowing down candidates while tracing from upstream to downstream is defined as downstream expansion. For example, narrowing down candidates while tracing from ④ to ③ is upstream expansion, and narrowing down candidates while tracing from ③ to ④ is downstream expansion.

In this manner, the query language parsing section 401 generates limitation conditions between elements included in query data, which are required when the query plan generation unit 113 generates a query plan.

The operation of the structure limitation condition generation section 402 will be described below with reference to FIG. 10.

The structure limitations of ② and ③ correspond to TID4 and TID6 on a structure model tree 1003 in FIG. 10. The structure limitation condition generation section 402 holds [TID4, TID6] as a pair as the structure limitations of ② and ③. In this manner, by obtaining the parent-child relationship of the structure limitations, the number of candidates can be narrowed down early by the structure limitation.

When the structured document search apparatus conducts search from ② to ③ (downstream expansion), the processing priority calculation section 406 executes processing for acquiring their child elements by accessing the structured document data storage unit 118, comparing the TID value of each acquired element with a TID value as a child TID limitation, and excluding, if they are different, from candidates. Conversely, when the structured document search apparatus conducts search from ③ to ② (upstream expansion), the processing priority calculation section 406 executes processing for acquiring their parent elements of respective candidates and comparing their TID values with a parent TID limitation value. Likewise, for an ID attribute (to be described as /@id), [TID4, TID5] are parsed in advance.

Figures 11, 12:
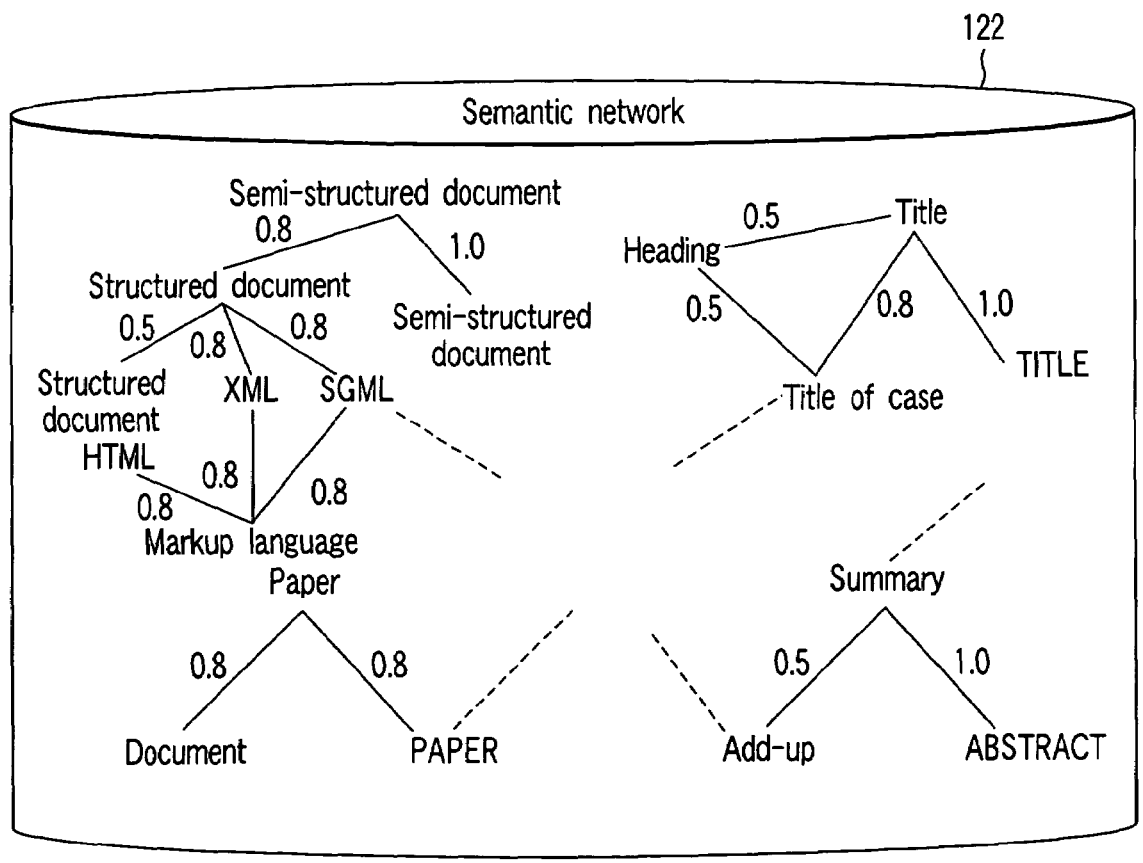
FIG. 11 shows an example of an XQuery which is received by the search processor shown in FIG. 1 and includes a plurality of documents.
FIG. 12 shows the contents of a semantic network storage unit shown in FIG. 1.

An example of a query will be described below with reference to FIG. 11.

In the processable query language represented by XQuery, the Return clause can describe a virtual element, attribute, character string, and the like, which do not actually exist on the database. In the query of FIG. 11, <booklist>, <author>, and <name>, a structure having /booklist/author/name, and the like are virtual data which are freely described by the user using the query and do not exist on the database. Since no virtual structure relationships such as $x, $y, and the like in the Return clause exist on the database, no relationship between a <book> tag to be finally output by $x and a <paper tag> to be finally output by $y exist on the database.

However, a data structure to be finally generated based on these composite documents is one indication of intention with respect to information the user wants. For example, when the result is summarized by <titleList>, the user expects that its contents are those related to <titleList>. When structures similar to these contents are set with higher score values, information with high precision can be quickly presented.

An example of the contents of the semantic network storage unit 122 will be described below with reference to FIG. 12.

A semantic network associates a word and another word related to this word with a similarity. The semantic network expresses a similar relationship among lexical items in the form of a graph. That is, lexical items having a similar relationship are connected via an arc, and a similarity value between these lexical items is given to the arc, thus forming a network among the lexical items. In the example of FIG. 12, for example, "structured document" is associated with "structure document" "XML", and "SGML" with a similarity=0.5, similarity=0.8, and similarity=0.8, respectively.

Figure 13:
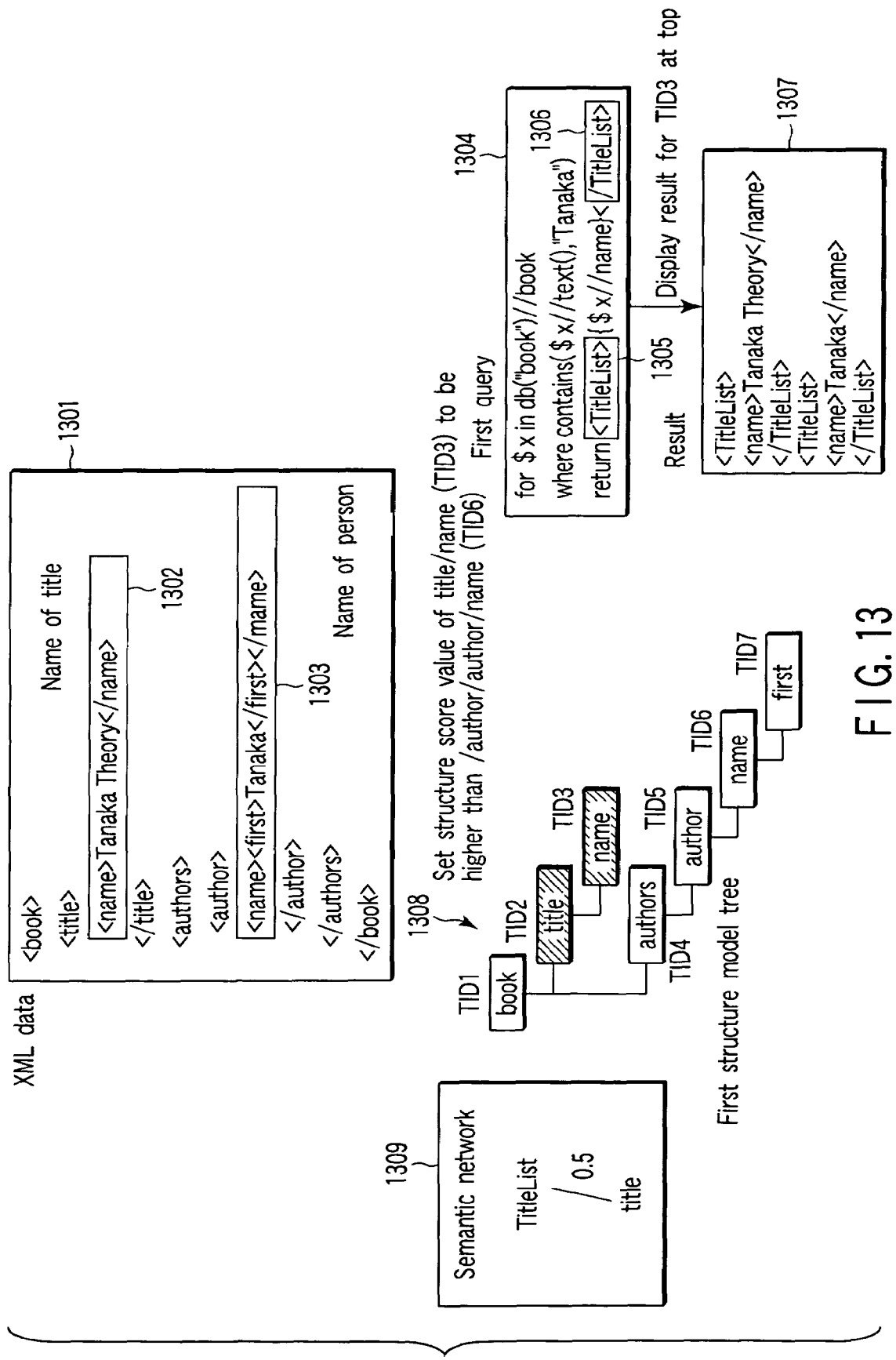
FIG. 13 is a view showing a scheme for calculating a structure score value by a similar structure search section shown in FIG. 4.

A case will be described in detail below with reference to FIG. 13 wherein the similar structure search section 403 calculates a structure score value. In the example of FIG. 13, a situation that XML data 1301 of a structured document has already been stored in the database will be examined. In this case, assume that a structure model tree is a first structure model tree 1308 shown in FIG. 13. Upon processing a first query 1304, the similar structure search section 403 initially searches the structure model tree for a structure similar to that of a composite document including a <TitleList> tag and a <name> tag to be finally output by $x, which are described in the Return clause. In this case, the similar structure search section 403 conducts search while absorbing fluctuations of tag names using the semantic network.

In this case, when a semantic network 1309 includes a relationship with a similarity=0.5 between TitleList and title, the similar structure search section 403 considers that a relationship of <titleList> <name> and that (/title/name) of <title> <name> have a similarity=0.5. Since the relationship /title/name corresponds to TID2 and TID3 on the first structure model tree 1308, the similar structure search section 403 sets structure score values of candidates which have these TID2 and TID3. Although the first structure model tree 1308 includes TID6 as a structure indicating <name>, it is <name> (/authors/author/name) of an <author> tag, and the similar structure search section 403 sets a low priority level of this structure.

In this case, for example, the similar structure search section 403 sets a structure score value=0.5 for TID3, and a structure score value=0.1 for TID6. The reason whey zero score value is not set for a TID which has no similarity is that a multiplication must be done with that structure score value upon executing the score calculation. Hence, this value is set to be a non-zero value as small as possible.

Upon execution of the structure limitation calculation, the structure limitations of $x are [TID1, TID3] and [TID1, TID6]. In these limitations, since a high score value of a candidate which match the limitation of TID3 is set, TID3 <name> Tanaka Theory</name> as the structure limitation of $x is displayed earlier as the output result.

Figure 14:
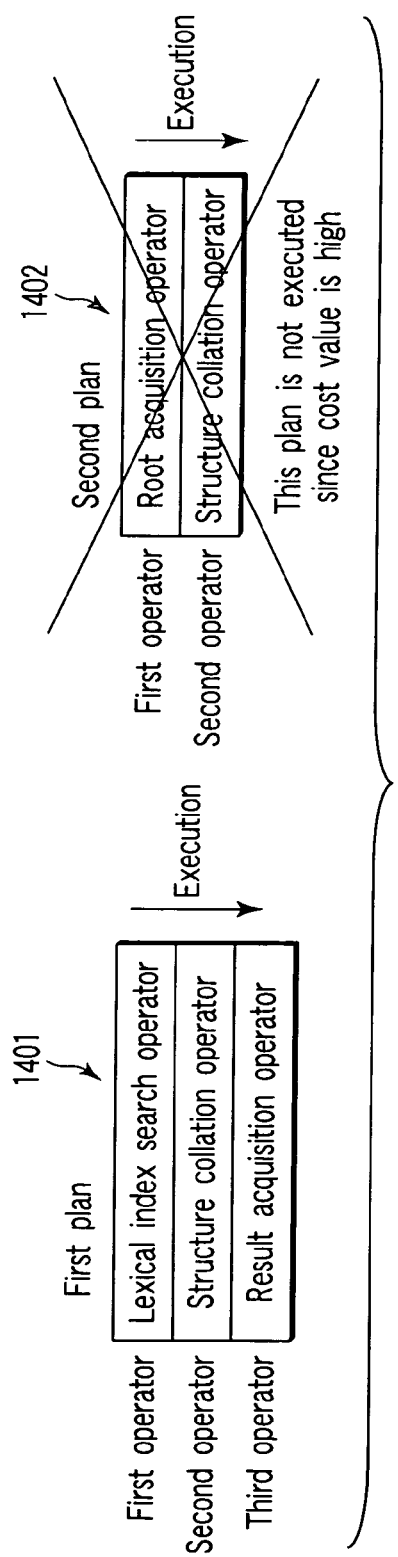
FIG. 14 shows an example of a query processing plan to be executed by a query execution unit shown in FIG. 1.

An example of a plan to be executed by the query execution unit 114 and operators included in this plan will be described below with reference to FIG. 14.

A first plan 1401 is an example of a plan including three operators, i.e., a lexical index search operator, structure collation operator, and result generation operator. Note that this plan is executed most frequently as a basis of a general search pattern. The plan generation section 405 generates another plan like a second plan 1402, but the query execution unit 114 selects and executes the first plan 1401 as a plan with a lowest processing cost.

The operation of the processing priority calculation section 406 will be described below with reference to FIG. 15.

As has been described previously with reference to FIG. 4 and the like, a processing cost value such as a processing cost or the like upon structure collation is calculated (step S1501). As this processing cost value, a processing cost is calculated using a value normalized by [0:1]. For example, when layers to be collated are deep or when the document size is huge, it is expected that the processing cost is high, and the lower processing cost value is set with increasing processing cost.

A structure cost is calculated (step S1502). More specifically, a structure score value is calculated. The structure score value is calculated by a similar structure search section 1403, and details of the calculation method have been described above with reference to FIG. 13.

It is checked if candidate sets which have already been processed by a plurality of lexical index search operators are obtained (step S1503). For example, when the lexical index search operator or the like which uses lexical index information is to be executed, there is no candidate set as an input. If these candidate sets are obtained, the flow advances to step S1504; otherwise, the flow advances to step S1505.

It is checked if processing for merging results using a plurality of lexical index search operators (i.e., combining processing) must be executed (step S1504). The results using the plurality of lexical index search operators are merged when searches including two or more keywords (in this example, "XML" and "Tanaka") as conditions are combined via "and" as in the example of FIG. 11, and such query is one of those which are popularly used in general. If the combining processing must be done, the flow advances to step S1506; otherwise, the flow advances to step S1505.

In step S1505, it is determined that only the calculation results of the processing cost and structure cost are used in the processing priority calculation without calculating any lexical cost, and the flow advances to step S1507.

In step S1507, a processing priority level is calculated based on the processing cost value, structure score value, and lexical score value. For example, the processing priority level is defined by a product of the processing cost value, structure score value, and lexical score value. When no lexical score value is calculated, the processing priority level is calculated based only on the processing cost value and structure score value. In this case, for example, the processing priority level is defined by a product of the processing cost value and structure score value.

In step S1506, a lexical cost is calculated. More specifically, a lexical cost value is calculated. In this case, since the condition in FIG. 15 is met, there are candidate sets obtained by executing two or more lexical index search operators as targets.

In this embodiment, when the statistical information generation unit 108 generates a lexical index, it generates a GID with a high degree of relevance (relevant GID) and a TID of a structure in which that GID occurs most frequently (relevant TID), and the index information storage unit 109 stores the relevant GID and relevant TID in the lexical index storage unit 119. Upon calculating a lexical score value, if there is a candidate which includes a common relevant GID and relevant TID in two or more candidate sets, a high score value is set for that candidate. In this case, the relevant GID, relevant TID, and the like may be expanded using the semantic network to include similarities.

A practical example upon calculating the lexical score value will be described below with reference to FIG. 16.

Figure 16:
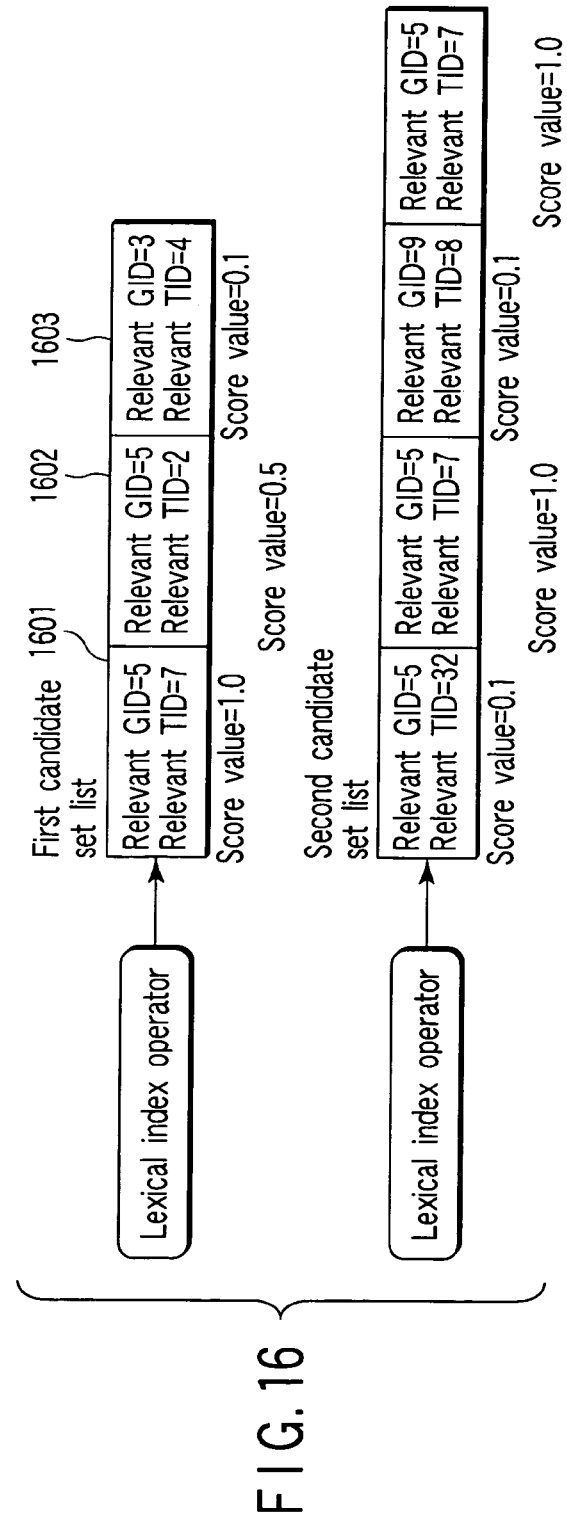
FIG. 16 is a view for explaining a scheme for calculating a lexical score value by the processing priority calculation section shown in FIG. 4.

In the example of FIG. 16, there are two candidate sets generated by candidate set lists by lexical index search operators, and lexical score values are calculated for these candidate sets. In a candidate 1601 in the first candidate set list, since relevant GID=5 and relevant TID=7 are perfectly and commonly present in the second candidate set list, a high lexical score value is set for them. In this example, the lexical score value is set to be 1.0.

In a candidate 1602, only relevant GID=5 matches but relevant TID=2 does not match. Hence, a lower lexical score value than the candidate 1601 is set. In this example, the lexical score value is set to be 0.5. In a candidate 1602, since even a relevant GID does not match, a still lower lexical score value is set. In this example, the lexical score value is set to be 0.1. Likewise, the calculations are made for the second candidate set list. In this example, the lexical score value of the candidate 1601 is set to be 1.0, that of the candidate 1602 is set to be 0.5, and that of the candidate 1603 is set to be 0.1. However, it is important for the calculation scheme of these values to make a calculation using the relevant GID and relevant TID as parameters, and other schemes may be used.

When the semantic network is used, if a lexical item obtained by expanding a lexical item corresponding to a relevant GID is present between two candidate sets, it may be reflected on the lexical score value together with its similarity. In this manner, a plurality of pieces of information required to calculate a processing priority level are obtained. The processing priority level is calculated based on them (step S1507), thus determining the presence/absence of processing execution.

Practical operations of the processing execution section 407 and result count check section 408 will be described below with reference to FIG. 17.

Figure 17:
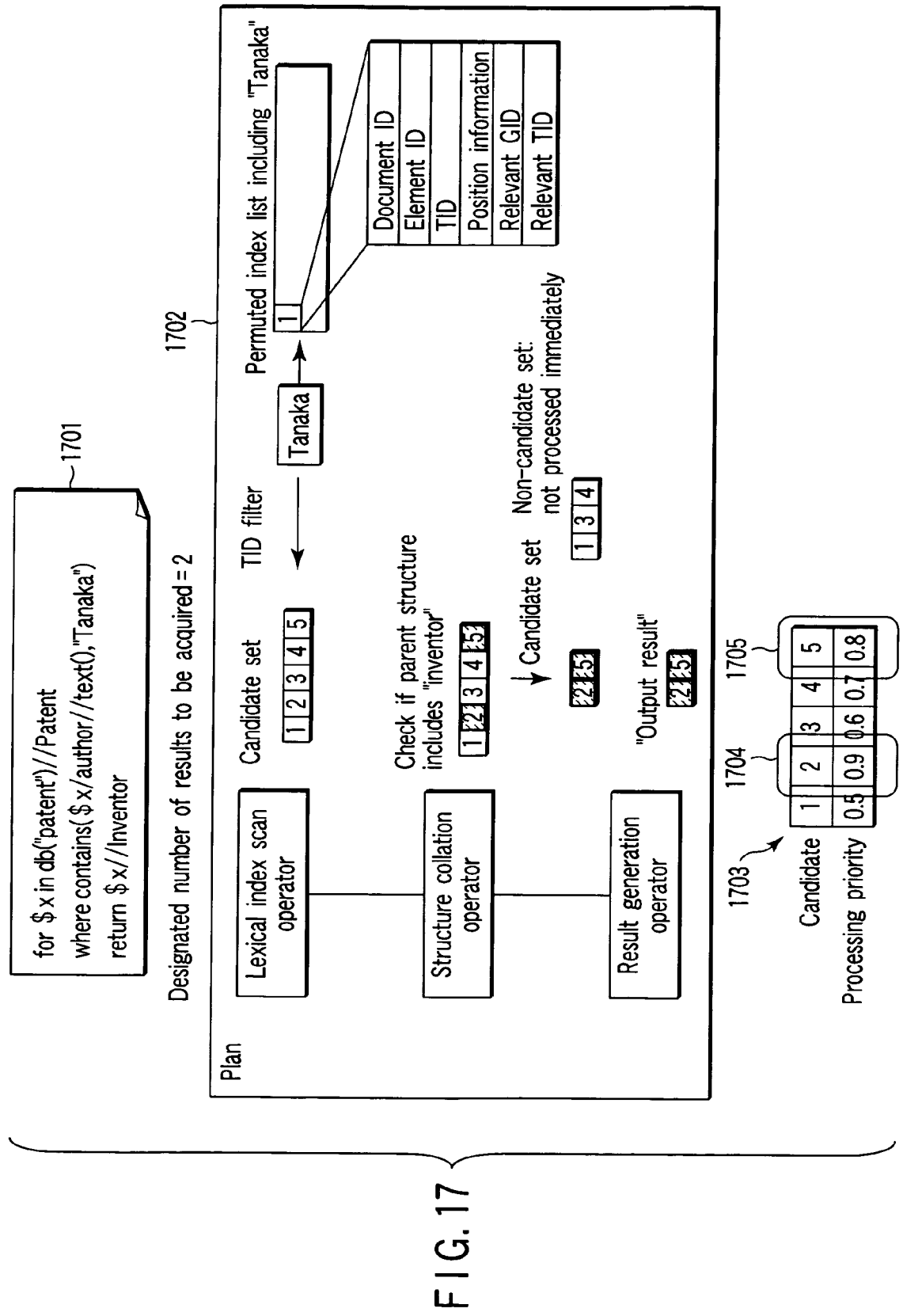
FIG. 17 is a view for explaining an example of the operations of a processing execution section and result count check section shown in FIG. 4.

FIG. 17 shows the processing sequence according to the processing priority levels. In this case, the processing priority calculation section 406 calculates the processing priority levels of five candidate sets, and two candidates with higher processing priority levels are preferentially processed, thus speeding up the processing. In this example, a second candidate 1704 and fifth candidate 1705 have higher priority levels, as shown in a table 1703 obtained by the processing priority calculation section 406.

As shown in FIG. 17, after the processing priority calculation section 406 and processing execution section 407 are repetitively executed according to a plan 1702, and the last operator is executed, the result count check section 408 checks the number of results. The result count check section 408 checks if the number of results of the query processing is equal to or smaller than the number of results to be acquired that the user wants. If the number of results of the query processing is equal to or smaller than the number of results to be acquired, the processing is re-executed from an operator which is not processed yet, thus repeating processing until the desired number of results to be acquired is consequently obtained.

A practical example of the structured document processing apparatus and structured document search apparatus will be described below.

In the following description, assume that the structured document processing apparatus stores three registered documents (first document 1802, second document 1803, and third document 1804), and the structured document search apparatus receives an XQuery (query A 1801) as a query.

(Practical Example of Structured Document Processing Apparatus)

A case will be explained below wherein the first document 1802 is to be registered.

Figure 19:
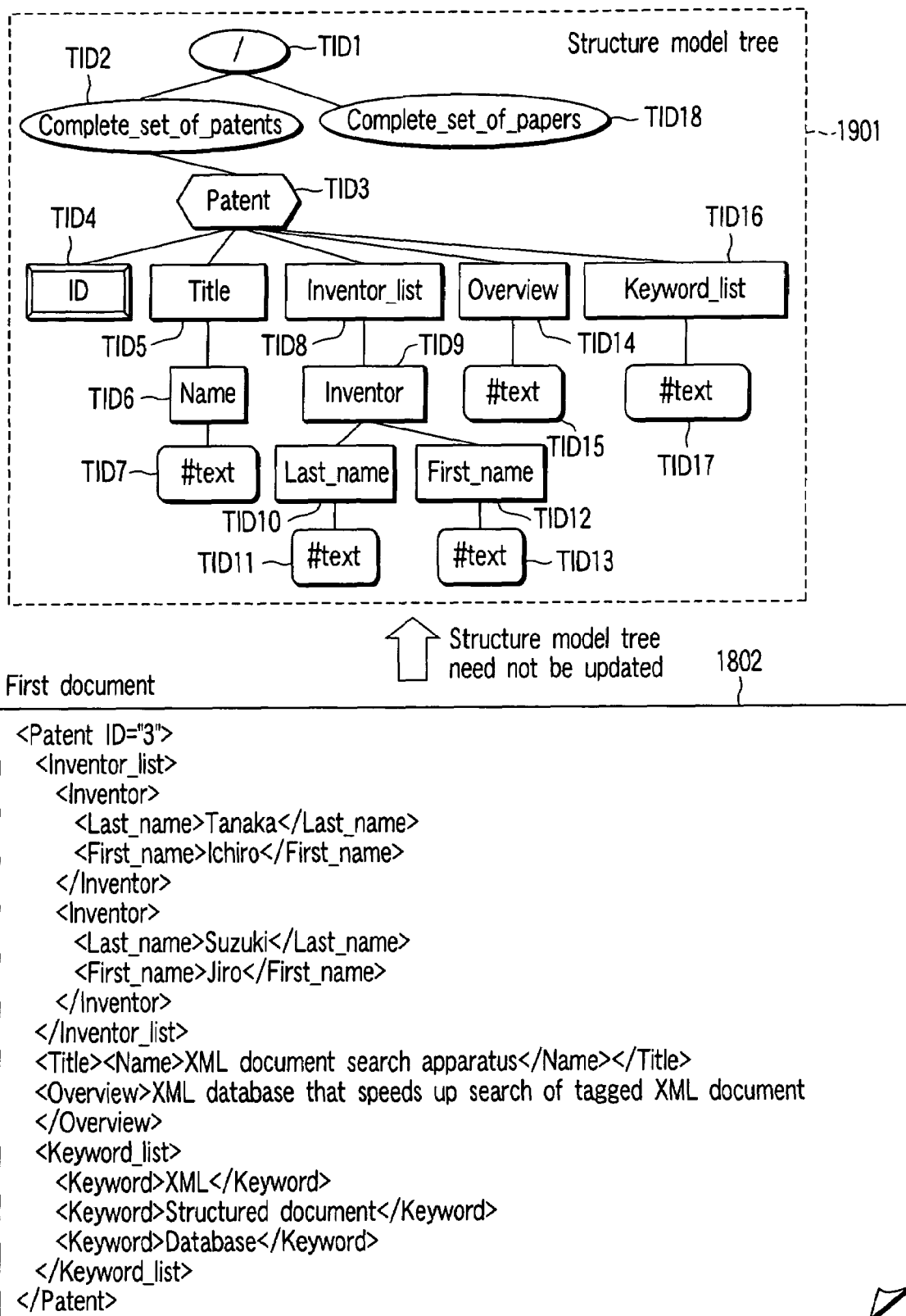
FIG. 19 shows a structure model tree corresponding to the example shown in FIG. 18.

The processing of the structure information extraction unit 107 is executed first. The structured document parsing section 301 parses the document structure of the first document 1802, and the structure model tree collation section 302 then collates a structure model tree with reference to the structure model tree storage unit 120. The structured document parsing section 301 appends information of corresponding TIDs to respective nodes of the parsed object tree, and stores these data in the structured document data storage unit 118. In this case, the system issues a document ID, element IDs, and the like. In this example, a document ID=3. If the structure model tree storage unit 120 has already stored a structure model tree 1901 shown in FIG. 19, when the structure model tree collation section 302 overlays structure information to have TID3 as a base point, it is determined that all structures overlap each other. Therefore, in this example, since no new nodes of the structure model tree increase, the structure model tree collation section 302 need not newly update the structure model tree.

Next, the processing of the statistical information calculation unit 108 starts. The text division section 305 divides a character string of each node, and performs indexing. A case will be described below with reference to FIG. 20 wherein a character string "Tanaka" in <last name> is to be indexed.

The text division section 305 divides a character string into lexical items of portions corresponding to the character string on the object tree. The lexical identifier specifying section 306 obtains as a lexical identifier, a document ID and element ID from which that lexical item occurs, position information as the position of occurrence, and a TID corresponding to that element (self TID). The relevant lexical item calculation section 307 calculates a relevant GID. In the following description, assume that the lowest frequency of occurrence is set to be "4" in advance. Since a character string value of <last name> includes only text "Tanaka", frequency-of-occurrence information for "Jiro" as a brother element of <last name> as a base point will be considered together. Since a lexical item having a maximum frequency of occurrence does not reach "4" as the lowest frequency of occurrence even in this stage, the search range is broadened to a parent element, and the same processing is also applied to <inventor>. By repeating this processing, the frequencies of occurrence of character strings in elements are counted in turn like /title/name, /overview, and keyword list/keyword.

Figure 20:
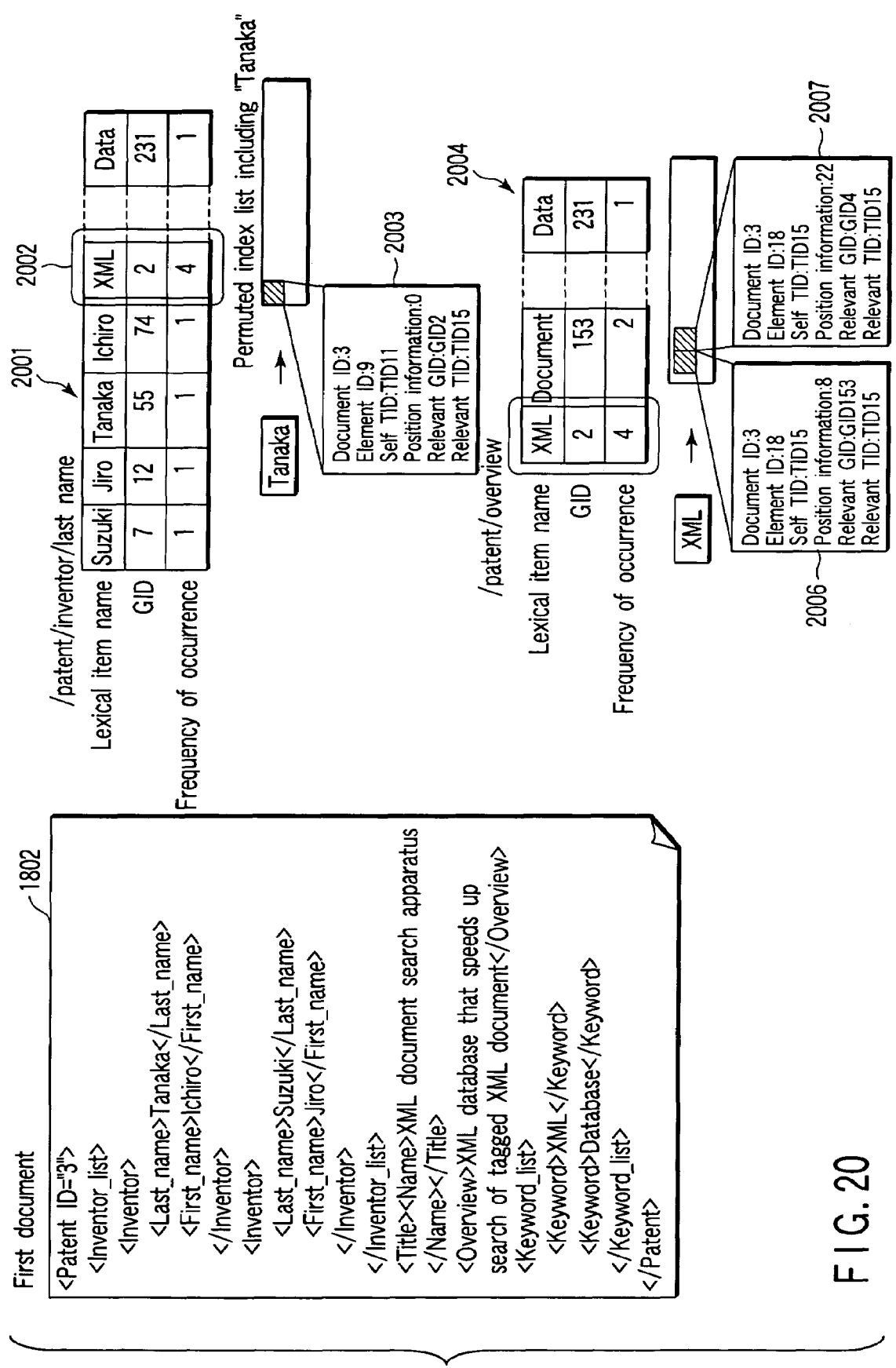
FIG. 20 is a view for explaining a practical indexing scheme.

At the time of keyword list/keyword, since the frequency of occurrence of a lexical item "XML" has reached "4", as shown in an item 2002 of XML in a table 2001 of FIG. 20, it is set as a relevant GID for the lexical item "Tanaka". A relevant TID is set to be TID15 corresponding to an element in which this GID occurs most frequently, i.e., an <overview> tag in this example. In this manner, the statistical information calculation unit 108 obtains lexical index information 2003 in FIG. 20. Likewise, FIG. 20 also shows an indexing example for "XML" in the <overview> character string. In this case, two pieces of lexical index information, i.e., lexical index information 2006 and lexical index information 2007 are generated.

Since all the pieces of lexical index information are obtained until this stage, they are stored as lexical index information in the lexical index storage unit 119. If a new lexical item occurs, a new permuted index list is generated.

Figure 21:
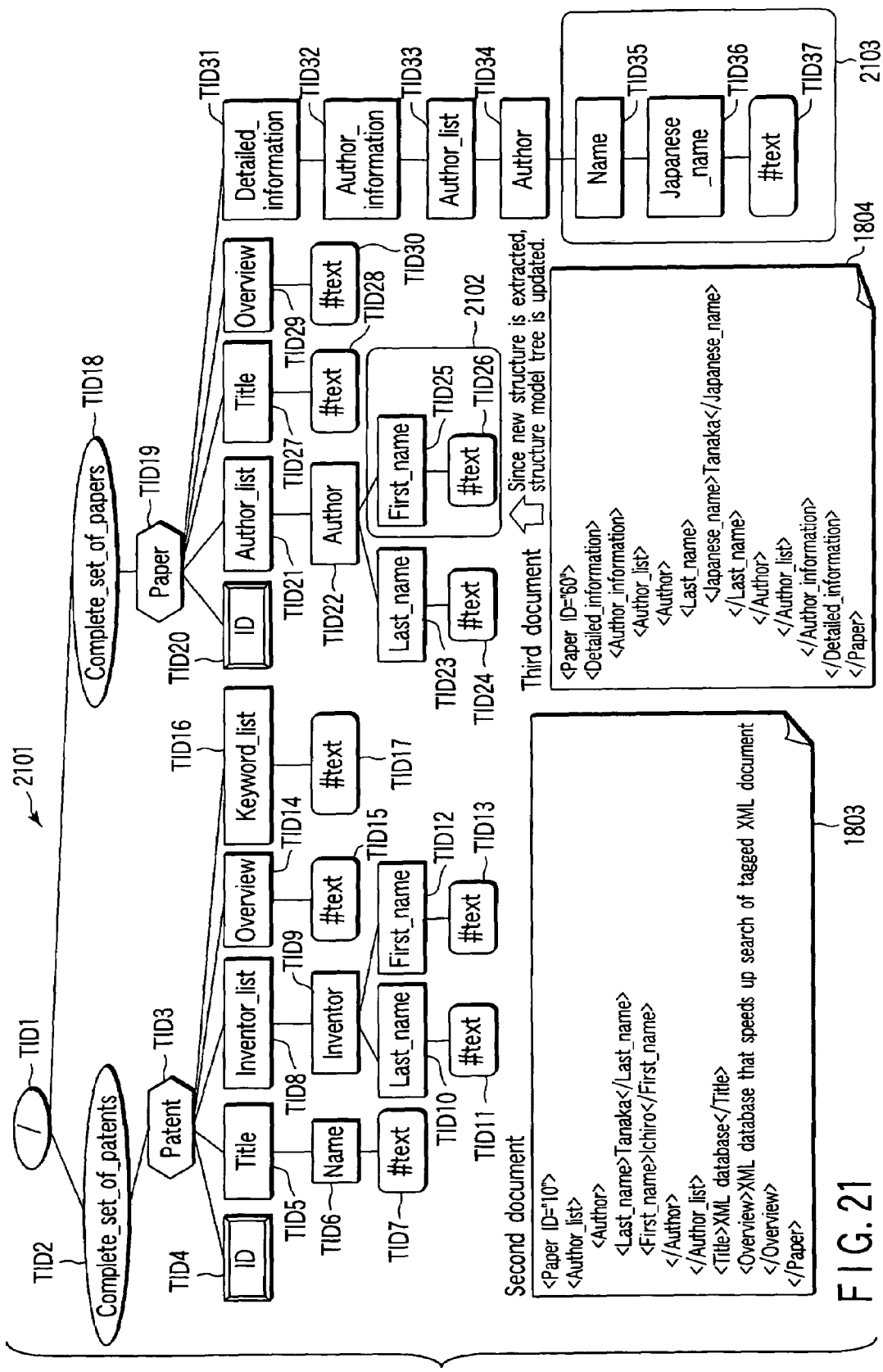
FIG. 21 shows a case wherein a new structure model tree is added to that shown in FIG. 19.

FIG. 21 shows structure information when the third document 1804 is registered under "complete set of papers" (TID18) in the same sequence. That is, after the structured document parsing section 301 parses the document structure of the third document 1804, the structure model tree collation section 302 collates a structure model tree with reference to the structure model tree storage unit 120. The structured document parsing section 301 appends information of corresponding TIDs to respective nodes of the parsed object tree, and stores these data in the structured document data storage unit 118. If the structure model tree storage unit 120 does not store any structure model tree on the right side of in FIG. 21 (a structure model tree under <paper> of TID19), since it is considered that new structure information is generated, the structure model tree updating unit 303 updates the structure model tree anew to include structures under <detailed information>.

(Practical Example of Structured Document Search Apparatus)

Figure 18:
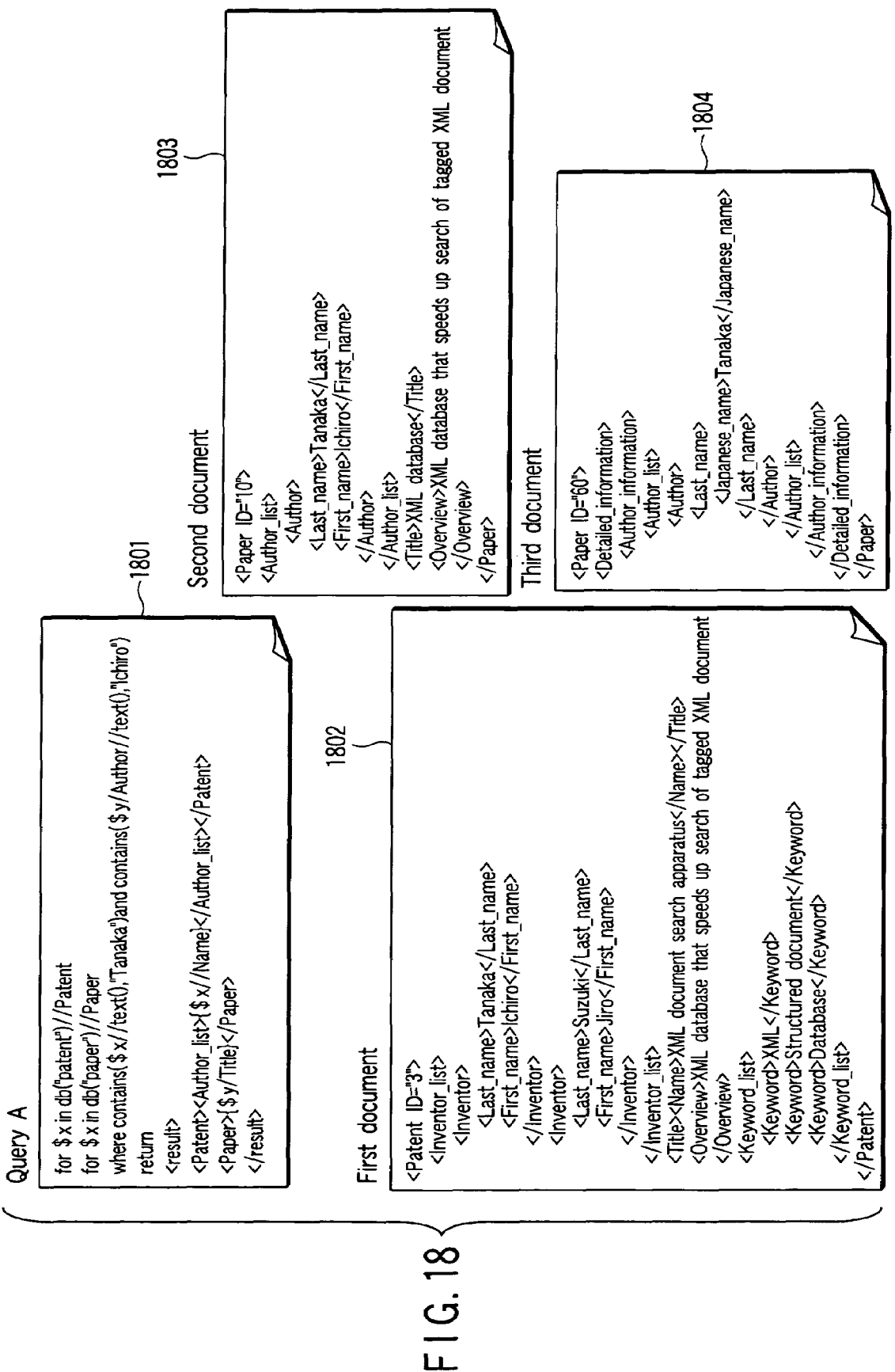
FIG. 18 shows an example of documents stored in the structured document processing apparatus shown in FIG. 1, and an example of an XQuery to be received by the structured document search apparatus shown in FIG. 1.
Figure 22:
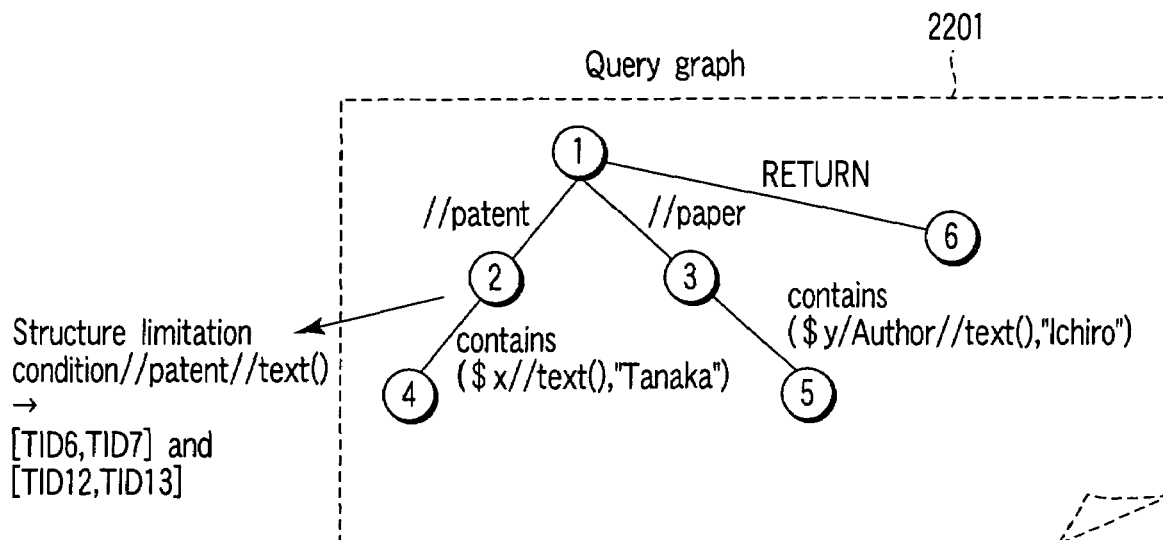
FIG. 22 shows a query graph corresponding to the XQuery in FIG. 18.

A query language (query) used in search is the query A shown in FIG. 18. The processing of the query parsing unit 112 is executed first. The query language parsing section 401 parses the query and generates a query graph. In this example, the query language parsing section 401 generates a query graph 2201 shown in FIG. 22.

Next, the structure limitation condition generation section 402 calculates structure limitation conditions. Since a limitation //name/text( ) is appended to $x, the structure model tree is searched for matching structure information. As can be seen from the structure model tree 1901 shown in FIG. 19, since two limitations [TID6, TID7] and [TID12, TID13] correspond to the above limitation.

Figure 23:
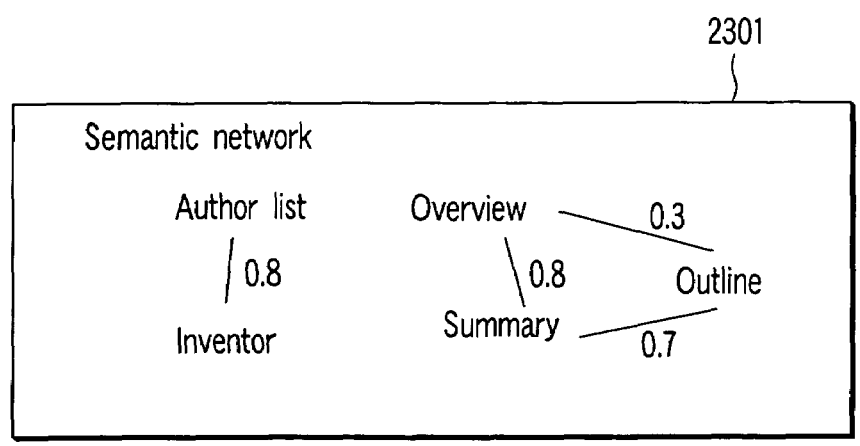
FIG. 23 shows a semantic network set in correspondence with the example of FIG. 18.

The similar structure search section 403 calculates a structure score value. Attention is focused on the Return clause as an output first. The query A 1801 in FIG. 18 is referred to. Although "author list" is a tag name which does not exist on the database as real data, in this example, the similar structure search section 403 searches the semantic network storage unit 122 and detects that <author list> matches <inventor> to have a similarity=0.8, as shown in FIG. 23. That is, focusing attention on $x, a structure /patent/inventor list/inventor/name has a high similarity to a structure that becomes involved with "author list". Hence, when the structure model tree is searched for a structure similar to /patent/inventor list/inventor/name, since TID13 hits, it is selected as a similar structure, and its similarity=0.8 is used as a reference value of the structure score value of TID 13.

The structure limitation conditions [TID12, TID13] and [TID6, TID7] are obtained previously. Since TID13 of the former condition matches this case, the previously obtained similarity=0.8 is set as the structure score value for [TID12, TID13]. Since [TID6, TID7] cannot be determined based on a similarity, the similar structure search section 403 sets a low structure score value in this case. In this case, the structure score value is set to be 0.5. The reason whey the structure score value is not set to be zero even in case of a mismatch is that the processing priority level is currently set by multiplications like "processing cost value x structure score value x lexical score value". For example, in order to enable values such as a lexical score value, a nonzero value is set. As a result, in this case, the structures score value of TID13 is set to be 0.8, and that of TID7 is set to be 0.5

Figure 24:
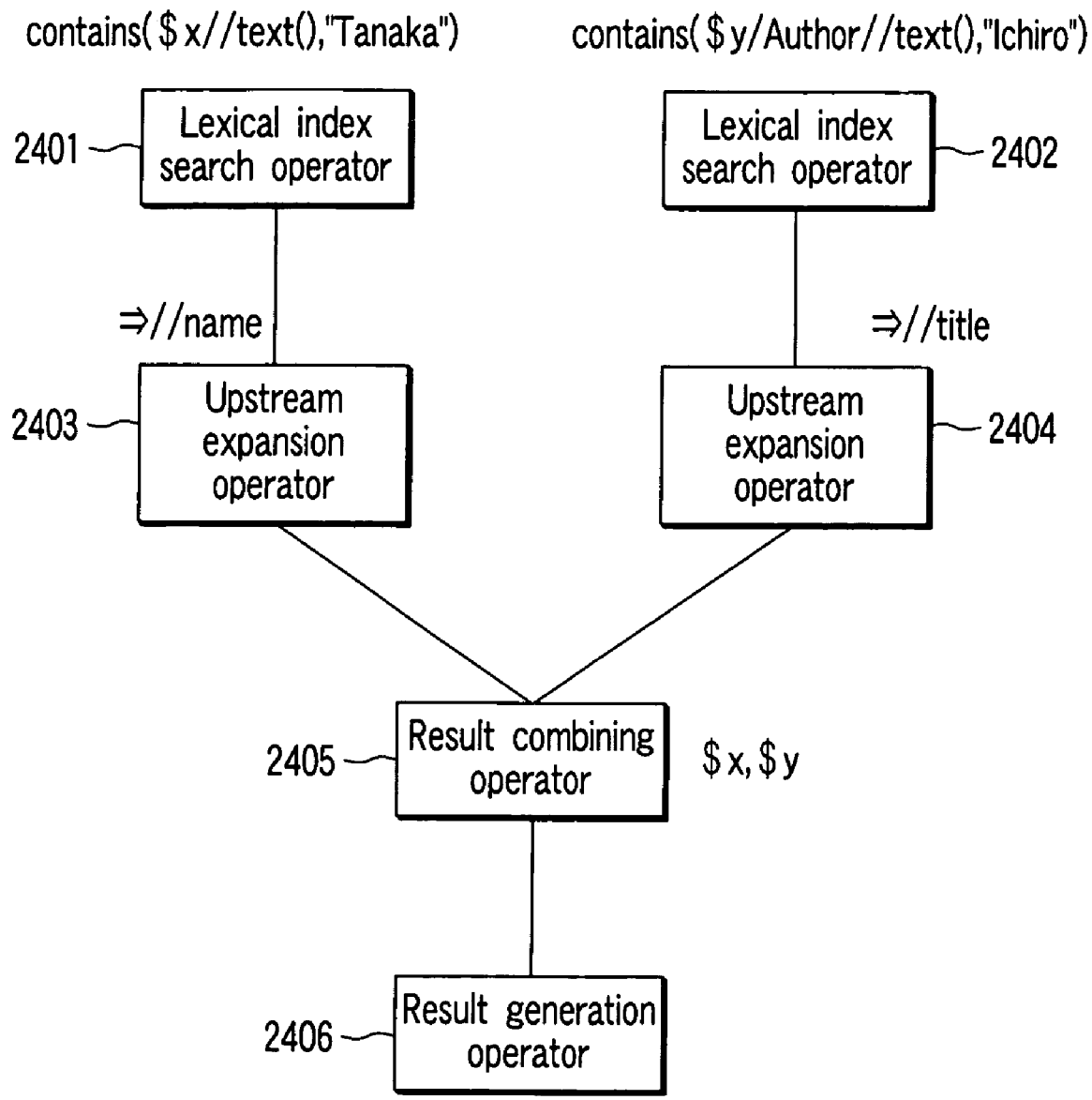
FIG. 24 shows an overview of a plan corresponding to the XQuery in FIG. 18.

The query processing cost estimation section 404 makes a processing cost value calculation, and the plan generation section 405 generates an optimal plan. FIG. 24 shows a search plan generated by the plan generation section 405. In this plan, operator processes of operator numbers 2401 to 2406 are executed in the order named. The flow of a series of operators of the plan is as follows. That is, lexical index search operators are respectively executed for $x (Tanaka) and $y (Ichiro) (2401, 2402), and structure collation is done by corresponding upstream expansion operators (2403, 2404). After that, a result combining operator for combining respective results is executed (2405), and a result generation operator for generating final results is executed (2406). Since the query plan generation unit 113 has generated the plan by the processes executed so far, the query execution unit 114 executes actual processes (operators) according to this plan.

The processes of respective operators to be executed by the processing execution section 407 will be described below. A lexical index search operator including "Tanaka" will be explained first. The lexical index search operator executes a sequence for searching a permuted index list for matching lexical index information using a lexical item such as "Tanaka" or the like as a key. In this case, processing for comparing TID information appended in advance as a structure limitation with structure limitation information obtained from the structure limitation obtained by the query parsing unit 112, and excluding candidate sets whose TIDs mismatch is executed.

Based on the structure limitation conditions obtained by the structure limitation condition generation section 402, as described above, the limitations of $x are [TID6, TID7] and [TID12, TID13] as TID sets. Since upstream expansion is made later, the required structure limitations are the latter TIDs of the pairs, and they correspond to {TID7, TID13} in this case.

In the example shown in FIG. 25, since a first candidate 2501 does not include any parameter which matches the structure limitation information obtained from the query, it is excluded from candidates in this stage (called filtering). However, as for a second candidate 2502, since TID7 matches as the structure limitation condition, this value remains as a candidate. Another candidate which is to remain is only a third candidate 2503 having TID13 as lexical index information. That is, five pieces of lexical index information are present on the list as lexical indices of "Tanaka", but the second candidate and third candidate which match {TID7, TID13} of the list remain as candidates.

Figure 15:
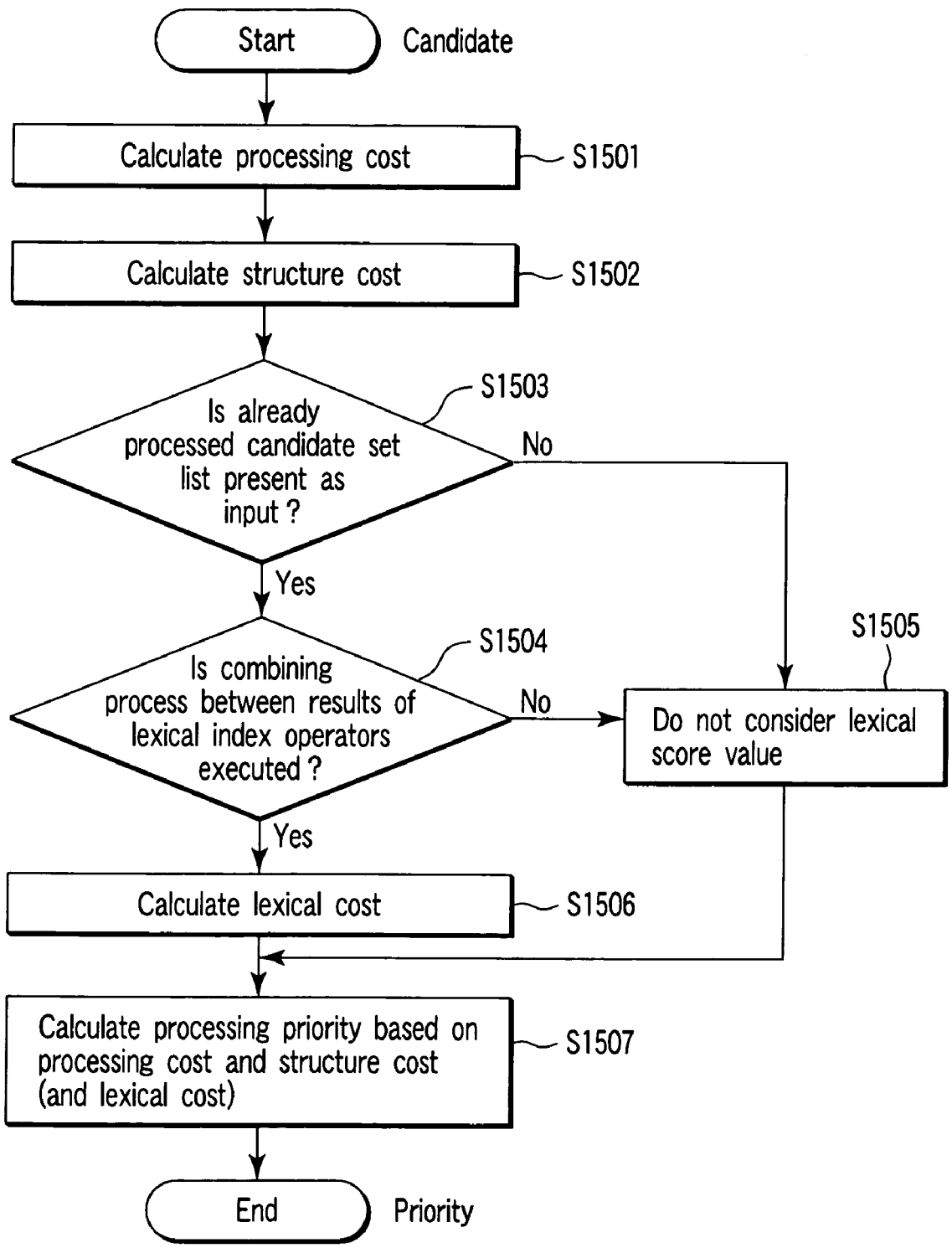
FIG. 15 is a flowchart showing an example of the operation of a processing priority calculation section shown in FIG. 4.

In the lexical index search operator which is executed first, since "NO" is determined in step S1503 according to the flowchart of FIG. 15, a lexical score value need not be considered. Operators which must calculate lexical score values are an upstream expansion operator, downstream expansion operator, and the like, and such calculations must be made when candidate sets have already been found and only when the next candidate set is to be selected.

The same applies to the lexical index search operator of $y. The structure limitations in this case are {TID26, TID37} in correspondence with 2102 and 2103 in FIG. 21 when the same calculations are made as in the above case of $x. As shown in FIG. 26, in this case, there are five candidates on a permuted index list. Since all the candidates meet the structure limitations, they remain as candidates.

The processing of the upstream expansion operator will be described below. Since the candidate sets are present, the upstream expansion operator calculates the lexical score values of respective candidates, and then calculates processing priority levels, thus preferentially processing a predetermined number of candidates with higher processing priority levels.

In FIG. 25, two candidates, i.e., the second candidate and third candidate remain, and it is determined if upstream expansion is applied to these two candidates. In order to calculate the processing priority level, the structure score value already calculated by the similar structure search section 403 is referred to. In the example of FIG. 25, the second candidate has TID7, and the structure score value for this candidate is 0.5 (default value). The third candidate has TID13, and the structure score value for this candidate is 0.8.

The structure score value for the upstream expansion operator 2404 shown in FIG. 24 will be explained first for the sake of descriptive convenience. In this case, {TID26, TID37} are obtained as the structure limitations. However, since they do not match TIDs obtained by the similar structure search section 403, the default value=0.5 is set as the structure score value.

An individual processing cost value is then calculated. As the method of calculating the processing cost value, various calculation methods may be used for respective operators. In this example, the processing cost value is calculated for each candidate in consideration of that of upstream expansion as the second operator. In this case, in place of collating the structure information by comparing the TID of the candidate with that on the structure model tree and actually accessing the structured document data storage unit 118, a required processing time can be roughly estimated by collating with the structure model tree stored in the structure model tree storage unit 120. In case of the structure collation operator, the processing cost value is estimated by the processing cost value=1/(the number of stages which are to undergo structure collation).

From the candidate set in FIG. 25, the structure information of the first candidate is TID7, and its structure limitation is [TID6, TID7]. That is, the structure collation processing which performs upstream expansion from TID7 and matches TID6 is to be executed. Since the number of stages of these TID6 and TID7 is one, the processing cost value in this case is 1/1=1. The processing cost value of the second candidate (structure information=TID13) is also 1.

Figure 27:
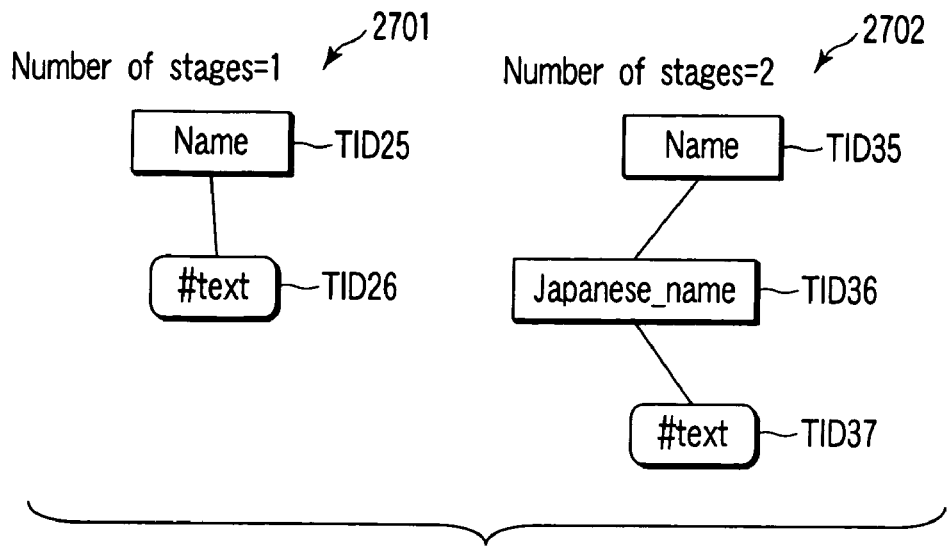
FIG. 27 is a view showing an example for explaining processing cost estimation in structure verification.

In case of the upstream expansion operator 2404 in FIG. 24, since the structure limitations are {TID26, TID37}, the processing cost values from nodes on the structure model tree corresponding to them until {TID25, TID35} are reached are calculated on the structure model tree. In this case, as shown in FIG. 27, since one stage is required for TID26, and two stages are required for TID35, the processing cost value for TID 26 is calculated as 1/1=1, and that for TID35 is calculated as 1/2=0.5

Next, lexical score values are calculated. From FIG. 15, the lexical score values are calculated under the condition that the combining processing of the lexical index search operators in step S1504 is executed. In the example of FIG. 24, since the result combining operator 2405 corresponds to this processing, lexical score values are calculated in this stage. In this case, relevant lexical GIDs and relevant TIDs which are appended to indices upon storage are used.

Figure 28:
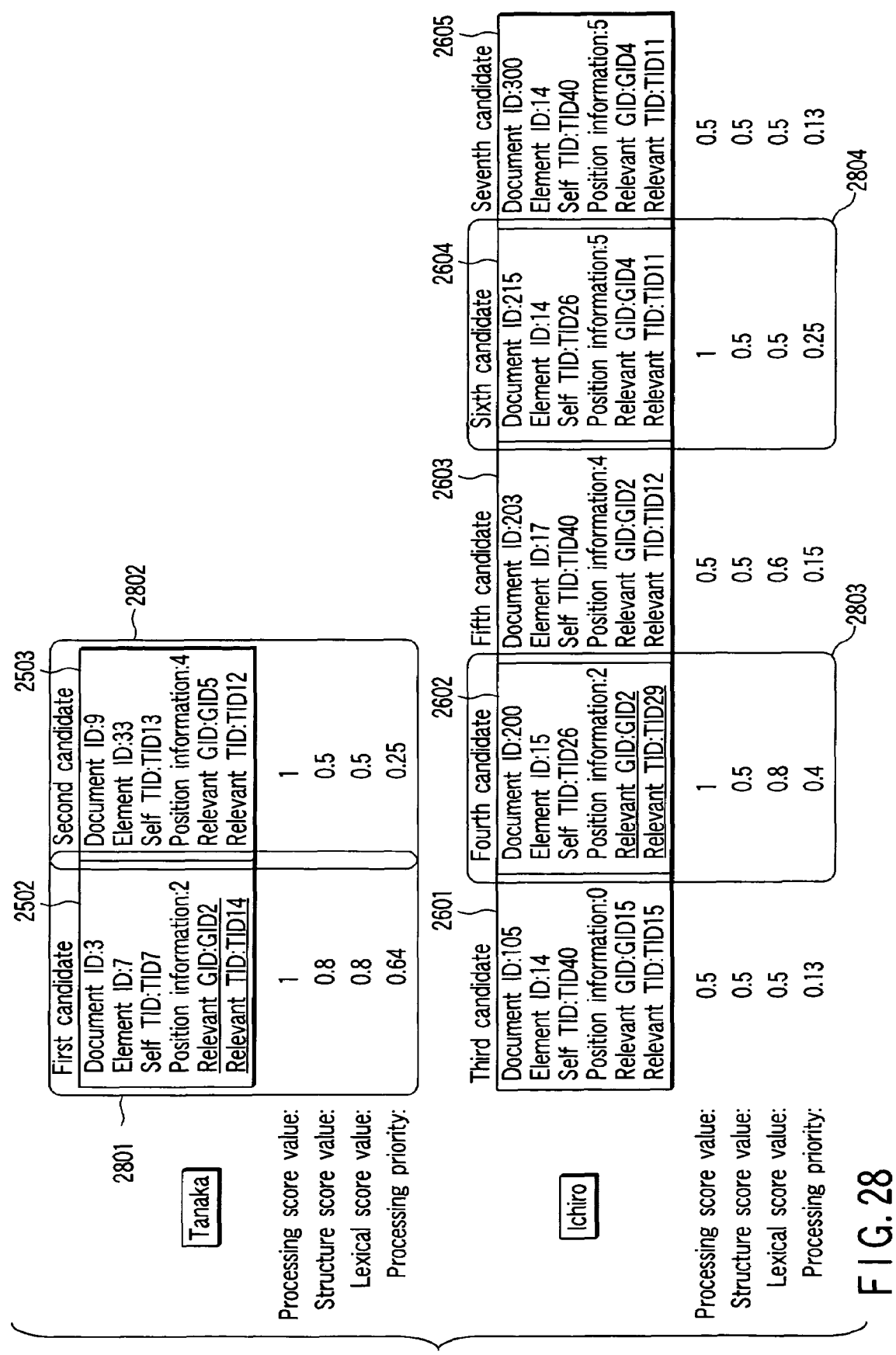
FIG. 28 is a view for explaining processing priority.

FIG. 28 shows a candidate set upon executing the upstream expansion operator. As described above, two candidates are generated from the lexical index search operator 2401 in FIG. 24, and five candidates are generated from the lexical index search operator 2402, and FIG. 28 shows lexical index information, processing cost values, structure score values, lexical score values to be calculated below, and processing priority levels to be calculated based on these values together of these candidates. In the description given so far, the processing cost values and structure score values have already been calculated, and lexical score values are to be calculated at this time.

In this case, it is collated if two lists include candidates which have common <relevant GID, relevant TID>. If candidates having common <relevant GID, relevant TID> are found, their lexical score values are set to be high; otherwise, lexical score values are set to be low. In this case, by performing N-stage expansion of relevant GIDs, relevant TIDs, and the like using the semantic network (to be referred to as synonym expansion hereinafter), search can be conducted not strictly but while leaving ambiguity. In this case, up to 1-stage expansion (N=1) is performed.

The lexical score value is set according to the following rules.

A. If both the relevant GID and relevant TID match, the lexical score value is set to be 1.

B. If neither the relevant GID nor relevant TID match, the lexical score value is set to be 0.5.

C. If only the relevant GID matches but the relevant TID is different, the lexical score value is set to be 0.6.

D. If the relevant GID and relevant TID match values expanded by the synonym expansion, its similarity is set as a lexical score value. In this case, however, the lower limit value of the lexical score value is 0.5 if the similarity is smaller than the lexical score value=0.6 of C.

Figure 29:
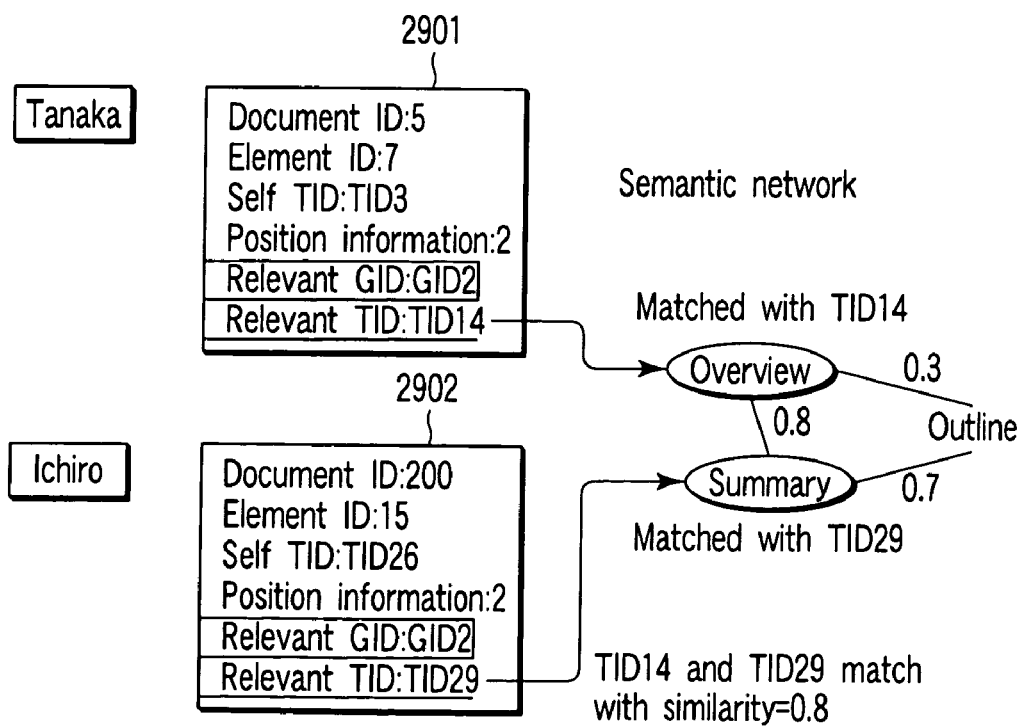
FIG. 29 is a view for explaining the processing method for lexical score values $x and $y.

A fourth candidate 2602 in FIG. 28 will be examined below as a calculation example of the lexical score value. In this case, relevant GID=2 and relevant TID=29. No candidate in the candidate set of $x completely matches relevant GID=2 and relevant TID=29. With reference to FIG. 29, this relevant TID corresponds to a tag name "overview". With reference to a semantic network in FIG. 21, "brief" matches "overview" to have a similarity=0.8. Hence, the synonym expansion yields 0.8, which is set as the lexical score value.

A case of a fifth candidate 2603 will be examined. In this case, relevant GID=2 and relevant TID=12. As for the relevant TID, no relevant TID matches even when the semantic network is expanded by only one stage, and a lexical score value is not determined by the synonym expansion. Since only the relevant GID matches, a lexical score value=0.6 is given in this case.

The aforementioned method of setting the lexical score value need only discriminate these candidates depending on the lexical score values, and various setting methods of lexical score values are available.

In this way, the processing priority calculation section 406 sets lexical score values for respective candidates while comparing relative GIDs and relative TIDs in the lists of two candidate sets. After the processing cost values, structure score values, and lexical score values are obtained, the processing priority calculation section 406 calculates final processing priority levels by multiplying these values. FIG. 28 also shows the processing priority levels. The processing priority calculation section 406 selects the first candidate and second candidate from the candidate set for $x, and the fourth candidate and sixth candidate for $y. The processing execution section 407 processes these selected candidates first.

After the processing priority levels are calculated, actual upstream expansion processing is applied to only the selected candidates. In this case, since the first candidate and second candidate in the candidate set for $x, and the fourth candidate and sixth candidate for $y have higher processing priority levels, the structure collation processing is executed first to these candidates. Finally, the result combining operator executes combining processing of a candidate set {first candidate, second candidate}, and a candidate set {fourth candidate, fifth candidate}. Since candidates which are expected to have lower score values are excluded by the processing executed so far, the combining processing cost can be reduced compared to the prior art.

An example of search results obtained by the execution processing of the operators will be described below with reference to FIG. 30. In the example of FIG. 30, three search results 3001 are displayed. In this manner, even when a plurality of variables are described in the <Return> clause to generate a composite document, appropriate scoring can be made. In addition, processing of candidates which have low score values and high processing costs is postponed, thus maintaining high-speed processing.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document processing apparatus comprising:

an acquisition unit configured to acquire a structured document;

a storage unit configured to store a structure model tree which indicates a typical structure of the acquired structured document;

a parsing unit configured to parse the acquired structured document;

an updating unit configured to update the structure model tree to match a structure of the parsed structured document therewith;

a division unit configured to divide the acquired structured document into a plurality of lexical items;

a calculation unit configured to calculate frequency-of-occurrence information indicating locations of each of the lexical items in the acquired structured document;

a broadening unit configured to broaden a range until a lexical item having not less than a frequency of occurrence is present within the range; and an assignment unit configured to assign a lexical identifier of a lexical item which has a highest frequency of occurrence within the broadened range as a relevant lexical identifier of the lexical item.

2. The apparatus according to claim 1, further comprising:

an extraction unit configured to extract a structure of the acquired structured document based on the parsed structured document; and a storage unit configured to store the extracted structure in the structure model tree storage unit a structure model tree.

3. The apparatus according to claim 1, wherein the broadening unit broadens the range in an order of an attribute, a child element, a brother element, and a parent element to have a position of the lexical item as a base point.

4. The apparatus according to claim 1, further comprising:

a storage unit configured to store respective relevant lexical Identifiers of the lexical hams;

an assignment unit configured to assign structure model tree identifiers to nodes of the structure model tree;

an assignment unit configured to assign a structure model tree identifier of a node where the relevant lexical identifier of a lexical item occurs most frequently a relevant structure model tree identifier; and a storage unit configured to store respective relevant structure model tree identifiers of the lexical items.

5. A structured document search apparatus comprising:

a connection unit connectable to a structured document processing apparatus that stores a structure model tree indicating a typical structure of a structured document, and frequency-of-occurrence information indicating locations of each of lexical items included in the structured document;

a reception unit configured to receive query data which is described in a query language and is required to generate a new composite document formed of partial structures of a plurality of structured documents;

a parsing unit configured to parse the query data including elements;

a query graph generation unit configured to generate a query graph indicating a relationship among the elements based on the parsed query data;

a selection unit configured to select, based on the frequency-of-occurrence information and the query graph, a similar structure similar to the structure model tree from the structured document processing apparatus;

a storage unit configured to store similarities indicating similar levels between lexical items;

a calculation unit configured to calculate a structure score value indicating a similar degree of the selected similar structure based on the similarities;

a cost calculation unit configured to calculate a plurality of processing costs for selecting plans indicating processing orders of elements based on the frequency-of-occurrence information;

a selection unit configured to select, from the plans, a plan which has a lowest processing cost of the calculated processing costs;

a priority calculation unit configured to calculate processing priority levels of a plurality of processes for making the plan based on the lowest processing cost and the structure score values;

a processing execution unit configured to execute the processes in descending order of the processing priority levels; and a result acquisition unit configured to acquire execution results of execution of the plurality of processes as search results.

6. The apparatus according to claim 5, wherein the parsing unit generates structure information of the query data, and the selection unit selects the similar structure similar to the structure model tree from the structured document processing apparatus based on the structure information.

7. The apparatus according to claim 5, wherein the priority calculation unit calculates the priority processing levels of the processes for making the plan, based on the structure score values and numerical values as products of processing cost values which correspond to inversely proportional values of magnitudes of the processing costs.

8. The apparatus according to claim 5, wherein the structured document processing apparatus further stores respective relevant lexical identifiers of the lexical items, assigns structure model tree identifiers to a plurality of nodes of a structure model tree, and assigns a structure model tree identifier of a node where one of the relevant lexical identifiers occurs most frequently as a relevant structure model tree identifier, the structured document search apparatus further comprises a lexical score value assigning unit configured to assign a relative value of one of the lexical items to each of the lexical items as a lexical score value based on the relevant lexical identifiers and the relevant structure model tree identifiers, the value increasing with an increase of number of the lexical items having an identical relevant lexical identifier which matches with the lexical items having an identical relevant structure model tree identifier, and wherein when the query language conducts search processing including a plurality of keywords, and when combining processing of index information is executed in the search processing, the priority calculation unit calculates the priority processing levels of the processes for making the plan based on the lexical score values, the lowest processing cost, and the structure score values.

9. A structured document system comprising:

a structured document processing apparatus comprising:

an acquisition unit configured to acquire a structured document;

a storage unit configured to store a structure model tree which indicates a typical structure of the acquired structured document;

a parsing unit configured to parse the acquired structured document;

an updating unit configured to update the structure model tree to match a structure of the parsed structured document therewith;

a division unit configured to divide the acquired structured document into a plurality of lexical items; and a calculation unit configured to calculate frequency-of-occurrence information indicating locations of each of the lexical items in the acquired structured document, and a structured document search apparatus comprising:

a reception unit configured to receive query data which is described in a query language and is required to generate a new composite document formed of partial structures of a plurality of structured documents;

a parsing unit configured to parse the query data including elements;

a query graph generation unit configured to generate a query graph indicating a relationship among the elements based on the parsed query data;

a selection unit configured to select, based on the frequency-of-occurrence information and the query graph, a similar structure similar to the structure model tree from the structured document processing apparatus;

a storage unit configured to store similarities indicating similar levels between lexical items;

a calculation unit configured to calculate a structure score value indicating a similar degree of the selected similar structure based on the similarities;

a cost calculation unit configured to calculate a plurality of processing costs for selecting plans indicating processing orders of elements based on the frequency-of-occurrence information;

a selection unit configured to select, from the plans, a plan which has a lowest processing cost of the calculated processing costs;

a priority calculation unit configured to calculate processing priority levels of a plurality of processes for making the plan based on the lowest processing cost and the structure score values;

a processing execution unit configured to execute the processes in descending order of the processing priority levels; and a result acquisition unit configured to acquire execution results of execution of the plurality of processes as search results.

10. The system according to claim 9, wherein the structured document processing apparatus further comprises:

a broadening unit configured to broaden a range until a lexical item having not less than a frequency of occurrence is present within the range; and an assignment unit configured to assign a lexical identifier of a lexical item which has a highest frequency of occurrence within the broadened range as a relevant lexical identifier of the lexical item.

11. The system according to claim 10, wherein the structured document processing apparatus further comprises:

a storage unit configured to store respective relevant lexical identifiers of the lexical items;

an assignment unit configured to assign structure model tree identifiers to nodes of the structure model tree;

an assignment unit configured to assign a structure model tree identifier of a node where the relevant lexical identifier of a lexical item occurs most frequently as a relevant structure model tree identifier; and a storage unit configured to store respective relevant structure model tree identifiers of the lexical items.

12. The system according to claim 10, wherein the structured document search apparatus further comprises:

a lexical score value assigning unit configured to assign a relative value of one of the lexical items to each of the lexical items as a lexical score value based on the relevant lexical identifiers and the relevant structure model tree identifiers, the value increasing with an increase of number of the lexical items having an identical relevant lexical identifier which matches with the lexical items having an identical relevant structure model tree identifier, and wherein when the query language conducts search processing including a plurality of keywords, and when combining processing of index information is executed in the search processing, the priority calculation unit calculates the priority processing levels of the processes for making the plan based on the lexical score values, the lowest processing cost, and the structure score values.

13. A structured document method comprising:

acquiring a structured document;

preparing a storage unit which stores a structure model tree in a database, the structure model tree indicating a typical structure of the acquired structured document;

parsing the acquired structured document;

updating the structure model tree to match a structure of the parsed structured document therewith;

dividing the acquired structured document into a plurality of lexical items;

calculating frequency-of-occurrence information indicating locations of each of the lexical items in the acquired structured document;

receiving query data which is described in a query language and is required to generate a new composite document formed of partial structures of a plurality of structured documents;

parsing the query data including elements;

generating a query graph indicating a relationship among the elements based on the parsed query data;

selecting, based on the frequency-of-occurrence information and the query graph, a similar structure similar to the structure model tree from the storage unit;

preparing a storage unit which stores similarities indicating similar levels between lexical items;

calculating a structure score value indicating a similar degree of the selected similar structure similar to the requested structure based on the similarities;

calculating a plurality of processing costs for selecting plans indicating processing orders of elements based on the frequency-of-occurrence information;

selecting, from the plans, a plan which has a lowest processing cost of the calculated processing costs;

calculating processing priority levels of a plurality of processes for making the plan based on the lowest processing cost and the structure score values;

executing the processes in descending order of the processing priority levels; and acquiring execution results of execution of the plurality of processes as search results.

14. The method according to claim 13, further comprising:

broadening a range until a lexical item having not less than a frequency of occurrence is present within the range; and assigning a lexical identifier of a lexical item which has a highest frequency of occurrence within the broadened range as a relevant lexical identifier of the lexical item.

15. The method according to claim 14, further comprising:

preparing a storage unit which stores respective relevant lexical identifiers of the lexical items;

assigning structure model tree identifiers to nodes of the structure model tree;

assigning a structure model tree identifier of a node where the relevant lexical identifier of a lexical item occurs most frequently as a relevant structure model tree identifier; and preparing a storage unit configured to store the respective relevant structure model tree identifiers of the lexical items.

16. The method according to claim 14, further comprising:

assigning a relative value of one of the lexical items to each of the lexical items as a lexical score value based on the relevant lexical identifiers and the relevant structure model tree identifiers, the value increasing with an increase of number of the lexical items having an identical relevant lexical identifier which matches with the lexical items having an identical relevant structure model tree identifier, and wherein when the query language conducts search processing including a plurality of keywords, and when combining processing of index information is executed in the search processing, the calculating the processing priority levels includes calculating the priority processing levels of the processes for making the plan based on the lexical score values, the lowest processing cost, and the structure score values.

17. A computer readable memory storing a structured document program, the computer-readable memory, comprising instructions for causing a computer to:

acquire a structured document;

access to a storage unit configured to store a structure model tree which indicates a typical structure of the acquired structured document;

parse the acquired structured document;

update the structure model tree to match a structure of the parsed structured document therewith;

divide the acquired structured document into a plurality of lexical items;

calculate frequency-of-occurrence information indicating locations of each of the lexical items in the acquired structured document;

receive query data which is described in a query language and is required to generate a new composite document formed of partial structures of a plurality of structured documents;

parse the query data including elements;

means for instructing the computer to generate a query graph indicating a relationship among the elements based on the parsed query data;

select, based on the frequency-of-occurrence information and the query graph, a similar structure similar to the structure model tree from the storage unit;

access to a storage unit configured to store similarities indicating similar levels between lexical items;

calculate a structure score value indicating a similar degree of the selected similar structure based on the similarities;

calculate a plurality of processing costs for selecting plans indicating processing orders of elements based on the frequency-of-occurrence information;

select, from the plans, a plan which has a lowest processing cost of the calculated processing costs;

calculate processing priority levels of a plurality of processes for making the plan based on the lowest processing cost and the structure score values;

execute the processes in descending order of the processing priority levels; and acquire execution results of execution of the plurality of processes as search results.

18. The computer-readable memory according to claim 17, further comprising instructions for causing the computer to:

broaden a range until a lexical item having not less than a frequency of occurrence is present within the range; and assign a lexical identifier of a lexical item which has a highest frequency of occurrence within the broadened range as a relevant lexical identifier of the lexical item.

19. The computer-readable memory according to claim 18, further comprising instructions for causing the computer to:

access to a storage unit configured to store respective relevant lexical identifiers of the lexical items;

assign structure model tree identifiers to nodes of the structure model tree;

assign a structure model tree identifier of a node where the relevant lexical identifier of a lexical item occurs most frequently as a relevant structure model tree identifier; and access to a storage unit configured to store respective relevant structure model tree identifiers of the lexical items.

20. The computer-readable memory according to claim 18, further comprising instructions for causing the computer to:

assign a relative value of one of the lexical items to each of the lexical items as a lexical score value based on the relevant lexical identifiers and the relevant structure model tree identifiers, the value increasing with an increase of number of the lexical items having an identical relevant lexical identifier which matches with lexical items having an identical relevant structure model tree identifier, and wherein when the query language conducts search processing including a plurality of keywords, and when combining processing of index information is executed in the search processing, the priority calculation unit calculates the priority processing levels of the processes for making the plan based on the lexical score values, the lowest processing cost, and the structure score values.

* * * * *

UNITED STATES PATENT AND TRADEMARK OFFICE
CERTIFICATE OF CORRECTION

| | | |
|---|---|---|
| PATENT NO. | : 7,613,602 B2 | Page 1 of 1 |
| APPLICATION NO. | : 11/388131 | |
| DATED | : November 3, 2009 | |
| INVENTOR(S) | : Kanawa | |

It is certified that error appears in the above-identified patent and that said Letters Patent is hereby corrected as shown below:

Column 27, line 16, change "unit a" to --unit as a--.

Column 27, line 25, change "Identifiers" to --identifiers--.

Column 27, line 25, change "hams;" to --items;--.

Column 27, line 30, change "frequently a" to --frequently as a--.

Column 31, line 15, change "computer readable" to --computer-readable--.

Column 31, lines 16-17, change "memory, comprising" to --memory comprising--.

Column 31, line 35, delete "means for instructing the computer to".

Signed and Sealed this

Twenty-sixth Day of January, 2010

David J. Kappos
*Director of the United States Patent and Trademark Office*